United States Patent [19]

Webb et al.

[11] Patent Number: 4,852,000

[45] Date of Patent: Jul. 25, 1989

[54] METHOD FOR EXPENSE REPORT STORAGE AND CALCULATION

[75] Inventors: Wayne A. Webb; Keith D. Scearce, both of Lancaster, Pa.

[73] Assignee: Universal Data Associates, New Holland, Pa.

[21] Appl. No.: 100,766

[22] Filed: Sep. 24, 1987

[51] Int. Cl.⁴ .................... G06F 15/21; G06F 15/30
[52] U.S. Cl. .................................. 364/406; 364/408; 364/900
[58] Field of Search ............... 364/401, 406, 408, 709, 364/710, 715, 200 MS File, 900 MS File, 715.01, 709.04, 710.04

[56] References Cited

U.S. PATENT DOCUMENTS

| | | | |
|---|---|---|---|
| 4,192,006 | 3/1980 | Hausdorff | 364/408 X |
| 4,244,020 | 6/1981 | Ratcliff | 364/709 X |
| 4,383,298 | 5/1983 | Huff et al. | 364/200 X |
| 4,633,397 | 12/1986 | Macco | 364/406 |
| 4,642,767 | 2/1987 | Lerner | 364/406 |
| 4,700,297 | 10/1987 | Hagel, Sr. et al. | 364/408 |

Primary Examiner—Joseph Ruggiero
Attorney, Agent, or Firm—L. L. Hallacher

[57] ABSTRACT

A system for maintaining a business record includes a main menu having a plurality of modular expense routines and a plurality of modular operational assistance routines. All the modular routines are individually identified and selectively callable by entering an individual alpha-numeric identifier for the particular module selected.

10 Claims, 29 Drawing Sheets

METHOD FOR EXPENSE REPORT STORAGE AND CALCULATION

BACKGROUND

This invention is directed to a system and method for conveniently and accurately storing and calculating business expenses.

Many professionals such as business people, salesmen, truckdrivers, pilots, etc. travel very extensively while practicing their professions. These people typically have substantial expenses for such items as food, lodging, transportation and many other items. The specific expenses must be categorized and accurate records kept in order to enable the traveler to submit accurate expense reports for reimbursement and tax purposes. Frequent travelers, therefore, are typically faced with the laborious and time-consuming task of categorizing the business expenses and submitting detailed reports for reimbursement and tax purposes. There, therefore, is a need for a system and method for accurately and conveniently storing and calculating business expenses at the convenience of the frequent traveler. The present invention fulfills these long-felt needs.

The invention provides a convenient means for the user to enter business data. The disclosed expense storage and processing system and method can be tailored to operate in several environments such as a lap computer, desk-top computer, pocket calculator or mainframe computer. The data input can be accomplished through any of several available means such as typing, keying or through advanced systems such as voice entry. Manual data entry can be accomplished on hardware integral to the storage and calculating system or through external hardware interfaced to a computing system, such as a modem or cellular telephone.

The invention has many distinct advantages. The software is broken down into modules so that every data entry category and special function is a self-contained program. Data entries can be easily modified by the use of a menu driven modify function. All business expense categories are provided for with the system and include such expenses as mileage, meals, lodging, telephone, telegraph and other communications, fuel, parking, tolls, miscellaneous items, gratuities, transportation, business conferences and entertainment. The invention is a user friendly system and is menu driven having specialized messages to prompt the user to respond with the correct information. The user supplied information is immediately verified for correctness upon entry of the data. All data entries and user supplied text descriptions are stored by the system automatically. All data are separated into specific categories immediately upon entry. The invention includes a feature which allows the user to enter and change data to a module, and the changes are automatically associated with data previously or subsequently entered and appears on hard copy reports generated by the system. The user can enter unique identifying titles and descriptive information for inclusion on printed reports. Mileage data can be entered using a direct mileage input or an odometer entry. Specific data identification such as persons names, meals, hotels, etc. can be entered by the user at will. The system includes a unique tag function whereby business reports for weeks or even months can b e entered at one session. Data can be provided to a disc memory, displayed on a CRT monitor, or output to a printer for a hard copy.

SUMMARY

A system for maintaining a business expense record includes a main menu of normal expense categories. The main menu includes a first plurality of modular expense routines and a second plurality of modular operational assistance routines. The expense routines and the operational assistance routines are individually identified by one character alpha-numeric identifications whereby the routines are separately and selectively addressable.

DETAILED DESCRIPTION

Figure 1:
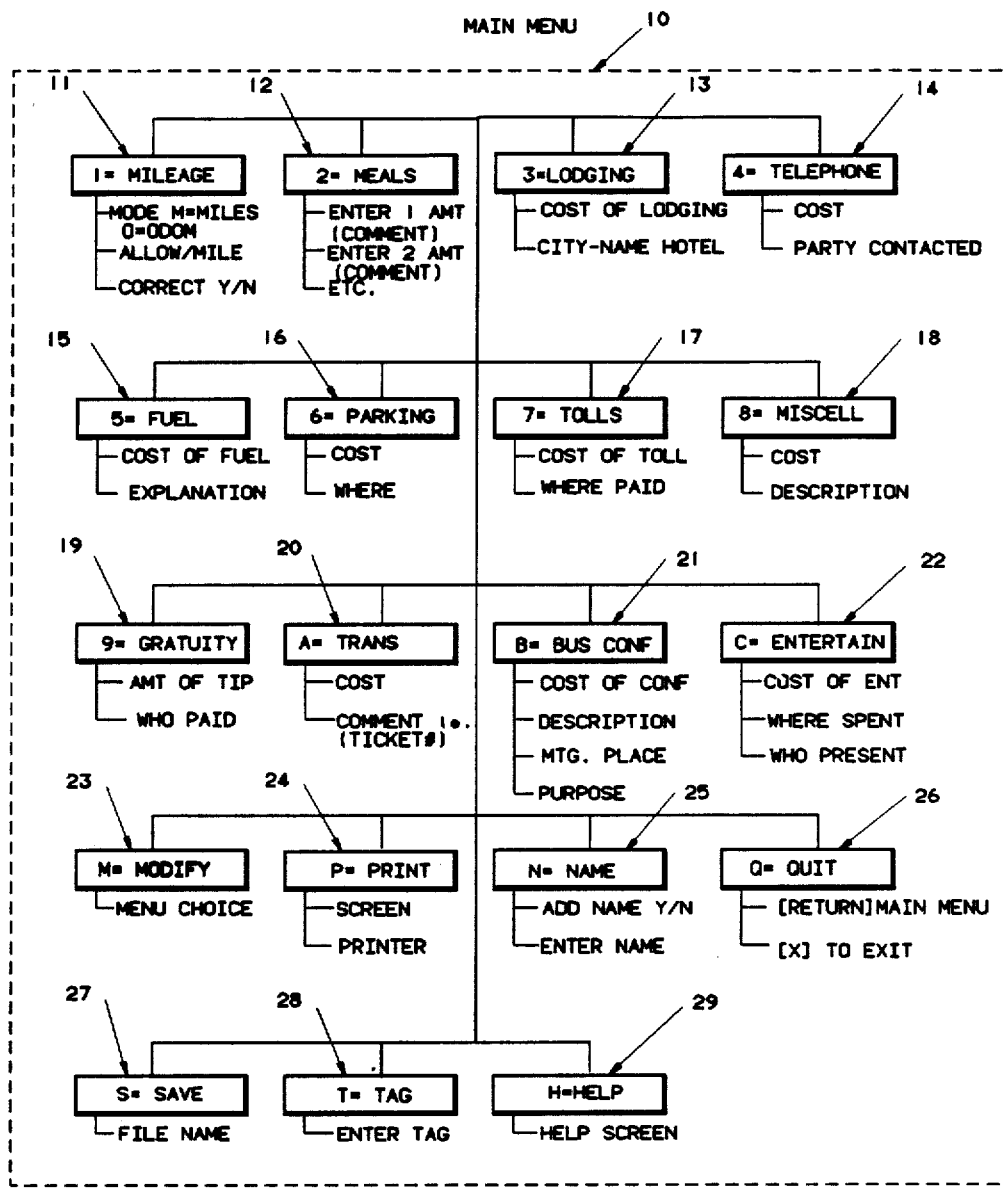
FIG. 1 shows a preferred embodiment.

In FIG. 1 a main menu 10 is shown including a plurality of modular expense routines 11 through 22 and a plurality of modular operational assistance routines 23 through 29. Each of the modular routines 11 through 29 is individually identified with a one character alpha-numeric identifier. Accordingly, each of the modular routines 11 through 29 can be individually called up by keying in the identifying alpha-numeric character by a convenient mechanism, such as a keyboard or a cellular telephone. The twelve modular expense routines 11 through 22 include the typical expenses oridinarily incurred by a frequent traveler, and which must be accurately maintained for reimbursement for tax form purposes. A miscellaneous routine 18 allows easy entry and storage of non-typical expenses. The seven modular operational assistance routines 23 through 29 are included in the main menu 10 in order to enable the user to utilize the data in a manner which is most useful to the user, and also to control the manner in which the data are output from the main menu. The modify module 23 is included to enable the user to modify any of the expense routines 11 through 22 at any time convenient to the user. The tag routine 28 permits the entry of data for a particular date or event, and all entries for all modules are associated with the date or event.

Figure 2:
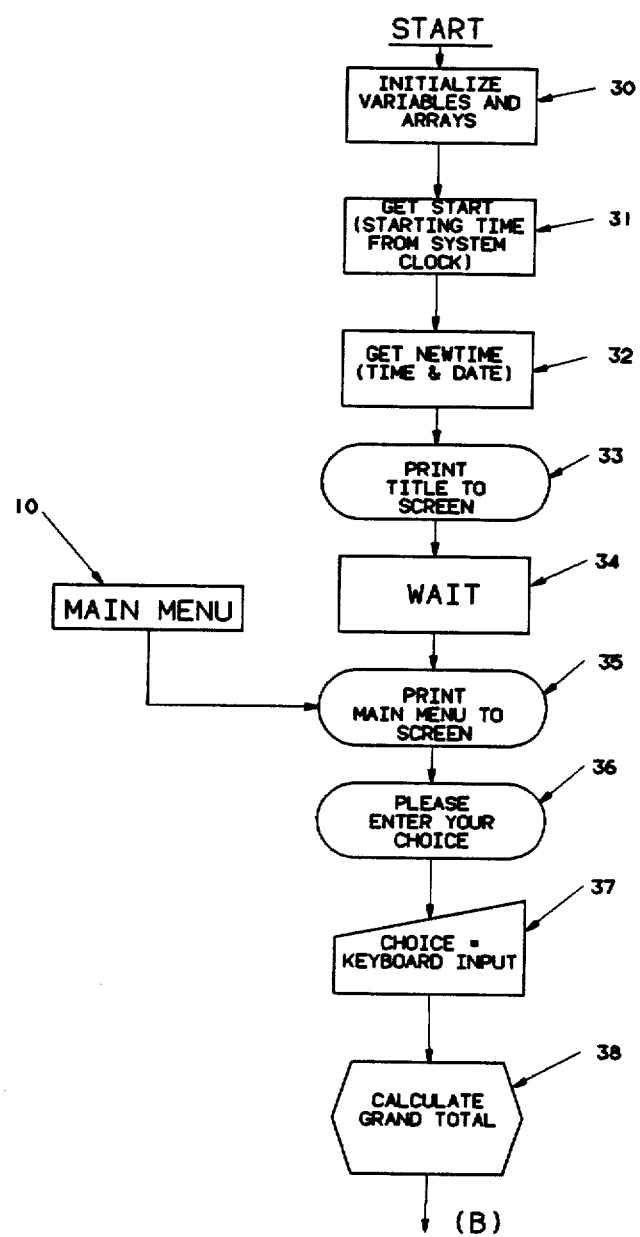
FIG. 2 is a flow chart of the main menu and choice entry.

FIG. 2 is a flow chart of the main menu 10 and choice entry. The system is initialized at step 30, and variable values are cleared and array sizes for the menu displays are selected. The array sizes are selected to provide sufficient space for the storage sufficient characters for each category. The selection of the array size is dependent upon the device upon which the data are displayed, such as a CRT monitor or a printing mechanism. The system clock is read and stored at step 31. When the system is initialized the clock readings at the beginning of the use can be compared to those at the end of the use to indicate the length of time that the system was used. This ability is valuable for billing purposes, when a subscriber is paying to use the system. At step 32 the time and date that the entries are being made are automatically recorded by the system to provide the user with a record of when the data entries were made. These times and dates can also be output onto hard copy when such a copy is produced. At step 33 the program title is displayed to the user to verify that the proper software has been selected. This is particularly important when the data are being input to a multiple tasking computer which is used concurrently by many user. At step 34 the system waits a few seconds before pulling the title from the display monitor prior to entering step 35 which displays the main menu on the monitor screen. The main menu is displayed on the monitor screen in a manner very similar to that disclosed in FIG. 1 with each ofthe modular routines identified with a specific alpha-numeric character. At step 36 the user is instructed to enter the choice of modules from the display of the main menu. Thus, a user wishing to utilize the mileage routine will key in the alpha-numeric identifier of the desired routine, which in FIG. 1 is 1. Similarly, a user wishing to use the modify routine will select this routine by keying in M. This is accomplished using step 37 which represents a keyboard input. At step 38 the total of previous data inputs for the selected data module are displayed and new data entries will be added to this grand total. The system then proceeds to the selected routine as indicated by the identifier B which appears at the end of the flow chart of FIG. 2 and at the beginning of the flow charts for each of the other modular routines.

Figure 3:
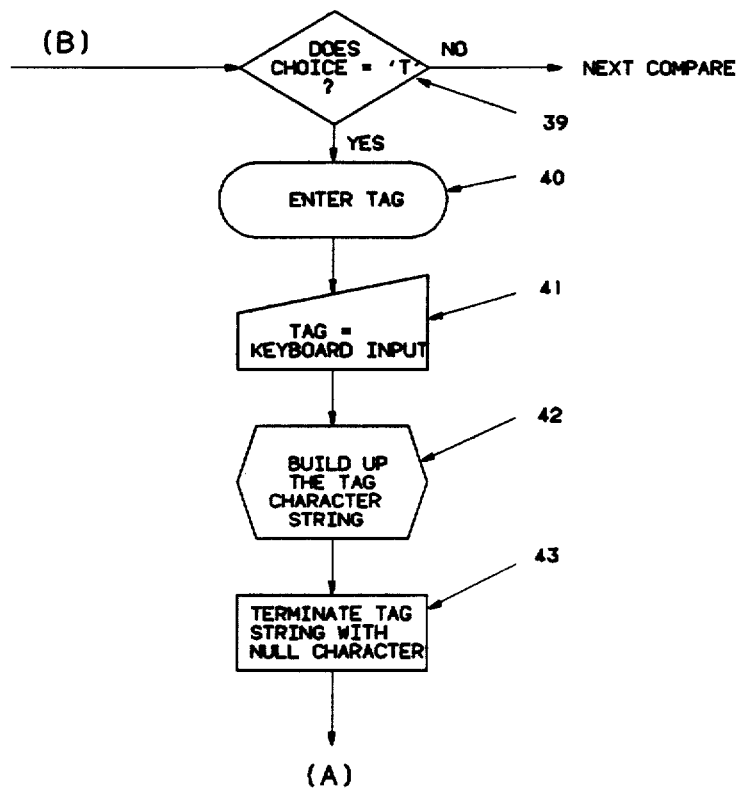
FIG. 3 is a flow chart of the tag entry routine.

FIG. 3 is a flow chart of the tag routine 28 of FIG. 1. The tag routine is selected by depressing the letter T from the main menu, as indicated at step 39 and shown in module 28 of FIG. 1. Thus, at step 40 the user is prompted to enter the tag routine and does so at step 41 by pressing the tag identifier T on the keyboard. At step 42 the user is prompted to build up the tag by entering as the characters which specifically identify an entry. At step 43 the tag entry is terminated with a null character, which is selected by the software programmer.

The tag module permits the entry of data for a particular date, event or any other selected identifier. All entries for all modules will be associated with the selected identifier. Thus, the tag module permits the tracking of expenses for a date, event or whatever. Any text entered during the tag routine is used for all subsequent entries for all routines until the tag routine is exited. Upon selection of the tag routine the user is prompted to enter the date or event for which he wishes to make entries. The user is then prompted to select another module, such as lodging or mileage, where an entry is to be made. After completing the entry, the user is prompted to select another routine for which the entry is to be made. This continues until the tag entry has been made to all desired routines. The text entry made at the initial tag selection is automatically entered in for the other routines until the tag routine is reentered and the text is modified, and therefore, the text need not be typed in again.

Figure 4A:
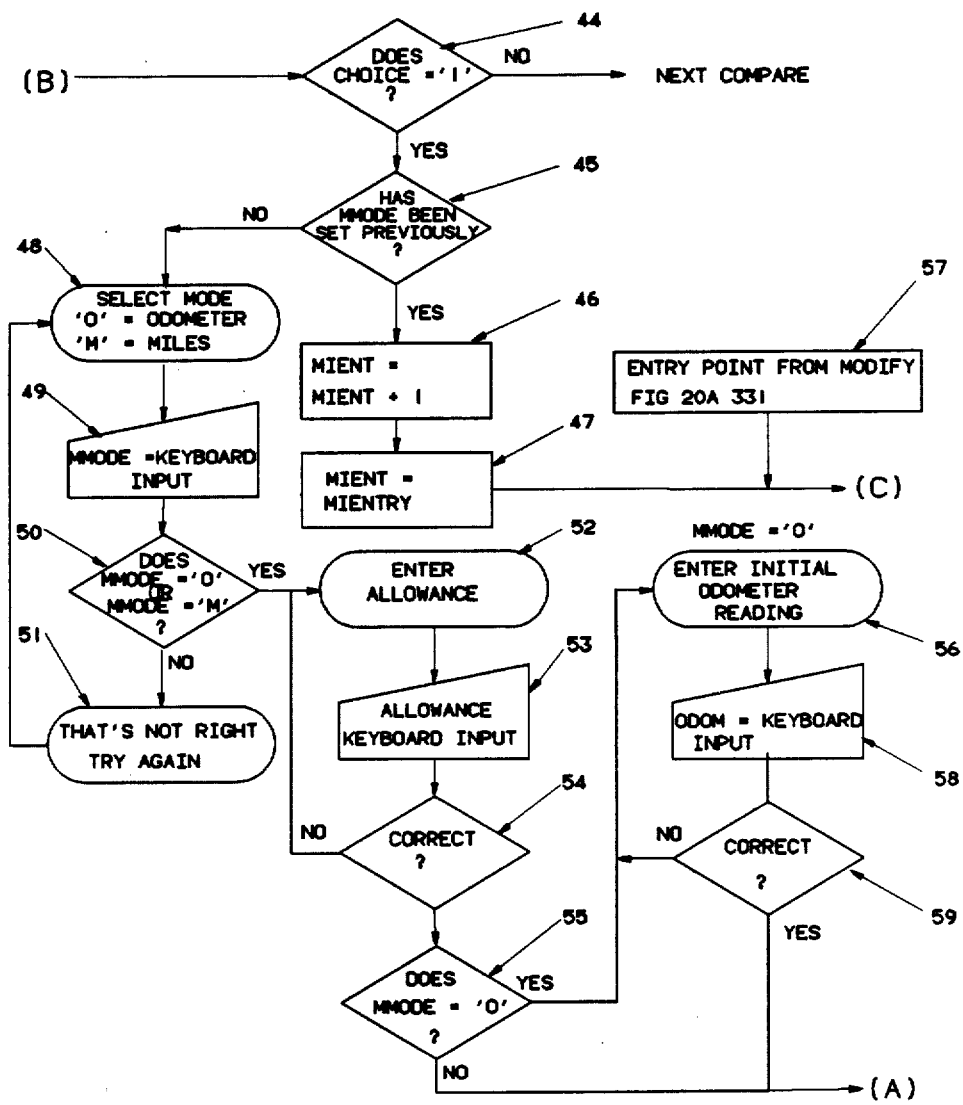
FIGS. 4a and 4b are a flow chart of the mileage routine.
Figure 4B:
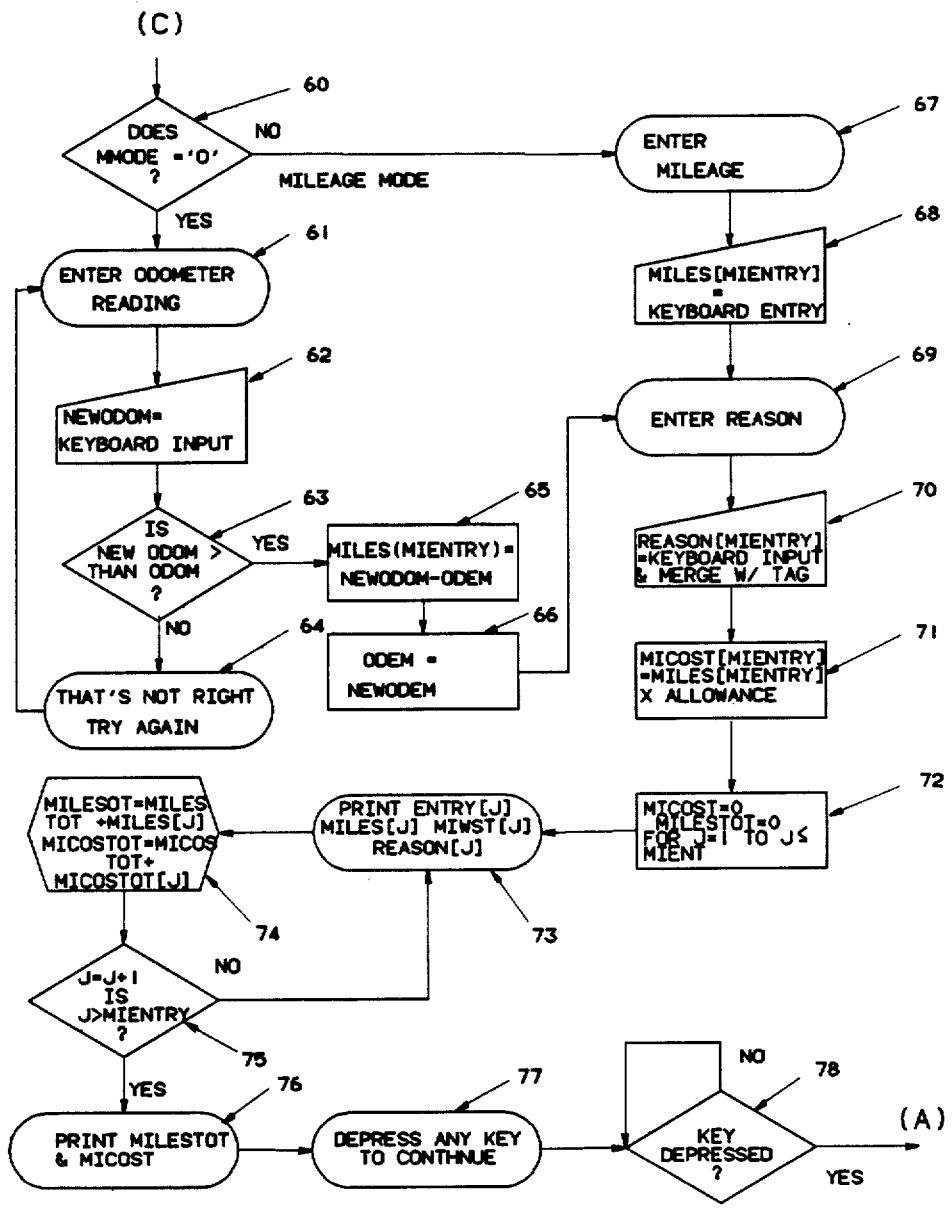

FIGS. 4A and 4B are a flow chart for the mileage module 11 of FIG. 1. The routine begins at step 44 to indicate that the mileage routine has been selected by keying in the identifier 1, as shown in module 11 of FIG. 1. At step 45, upon the intial selection of the mileage routine the answer must be no. Step 48 is next entered and the user selects either "odometer" or "miles" mode. Step 52 is then entered, through steps 49 and 50, and the user then enters the mileage allowance. Steps 53 to 55 are then entered, and at step 55 '0' means the odometer mode was selected. This selection then goes to steps 56 to 59 to return to the main menu in FIG. 2. At step 55, when the mileage mode was selected the main menu is immediately returned to. Upon return to the main menu, the user again selects the mileage routine to enter the mileage routine. Upon reentry to step 45 the mode has been previously selected, and steps 46 and 47 are entered to set the counter for the actual number of mileage entries and also for the present mileage entry, as shown in Table 1. Table 1 also shows the other important variables utilized by the mileage entry module.

TABLE 1

IMPORTANT VARIABLES UTILIZED BY THE MILEAGE ROUTINE

| VARIABLE | TYPE | USAGE |
| --- | --- | --- |
| mient | integer | counter for the actual number of mileage entries |
| mientry | integer | counter for the present mileage entry |
| mmode | character | users choice, direct miles entry or odometer reading mode |
| michoice | character | users answer to correctness of entries made |
| allowance | real | allowance per mile (cost) |
| odem | real | odometer base used for calculating mileage for subsequent entries |
| newodem | real | present odometer reading |
| miles | real | mileage for a particular entry |
| micost | real | cost of individual entries |
| reason | character | text description of the accumulated mileage; storage for 50 entries each having a maximum of 80 characters |
| milestot | real | total accumulated mileage |
| micostat | real | total cost of accumulated mileage |
| J | integer | used to point to the mileage entry variable for display after entries are made |

Figure 20A:
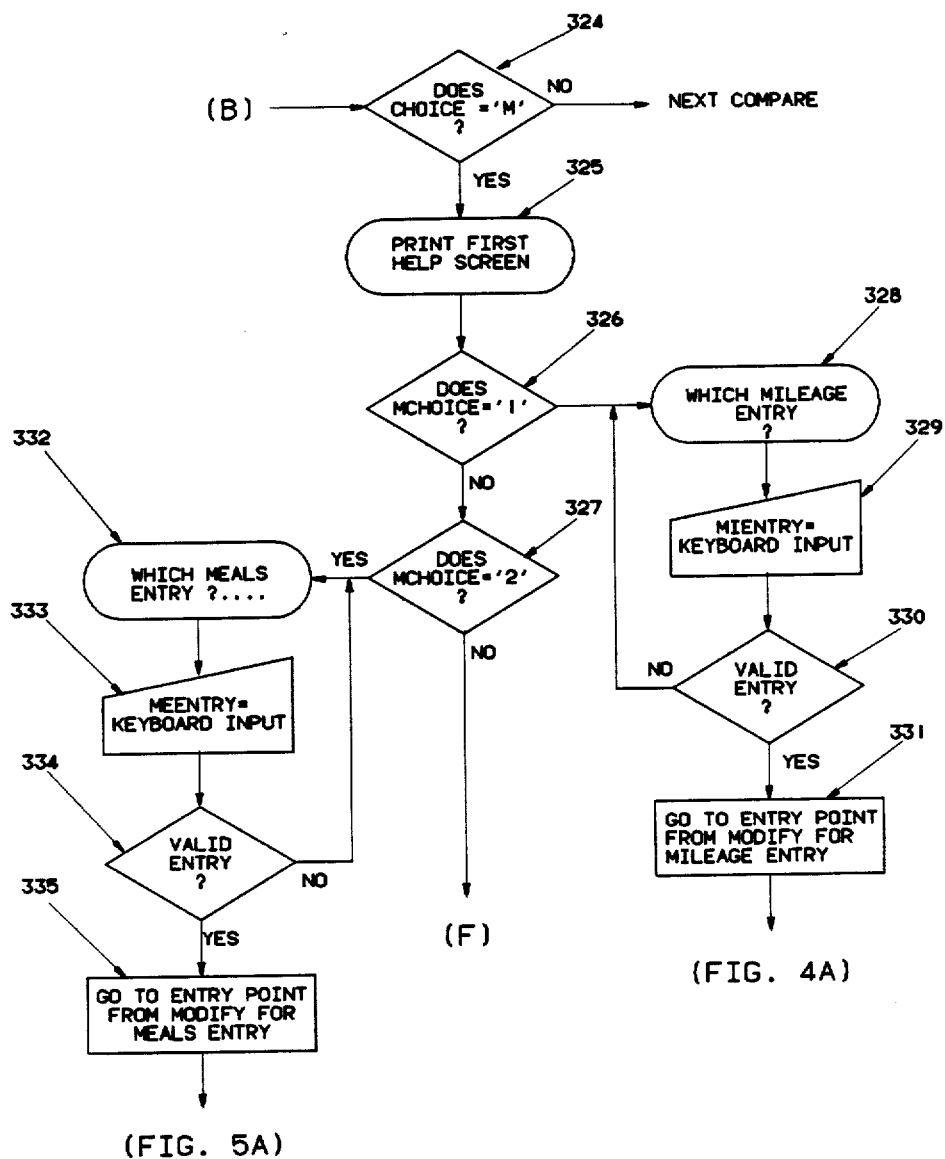
FIGS. 20a, 20b, 20c, 20d, 20e and 20f are a flow chart of the modify routine.
Figure 20B:
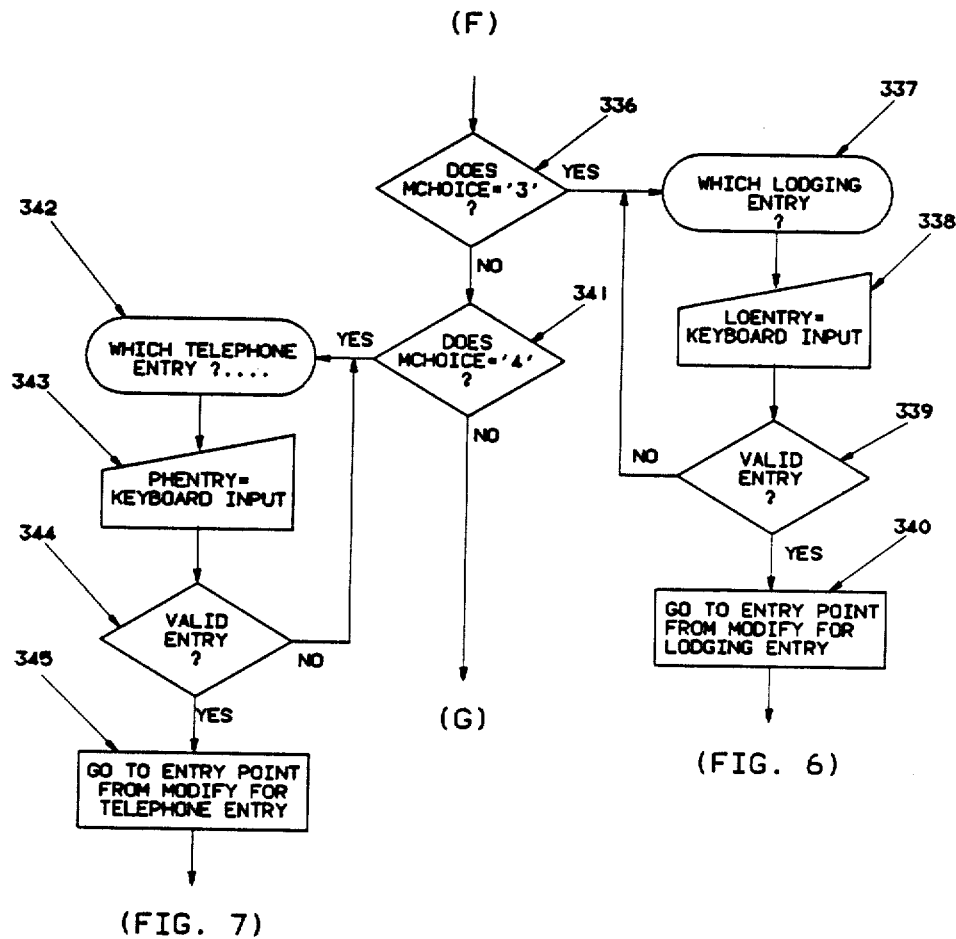
Figure 20C:
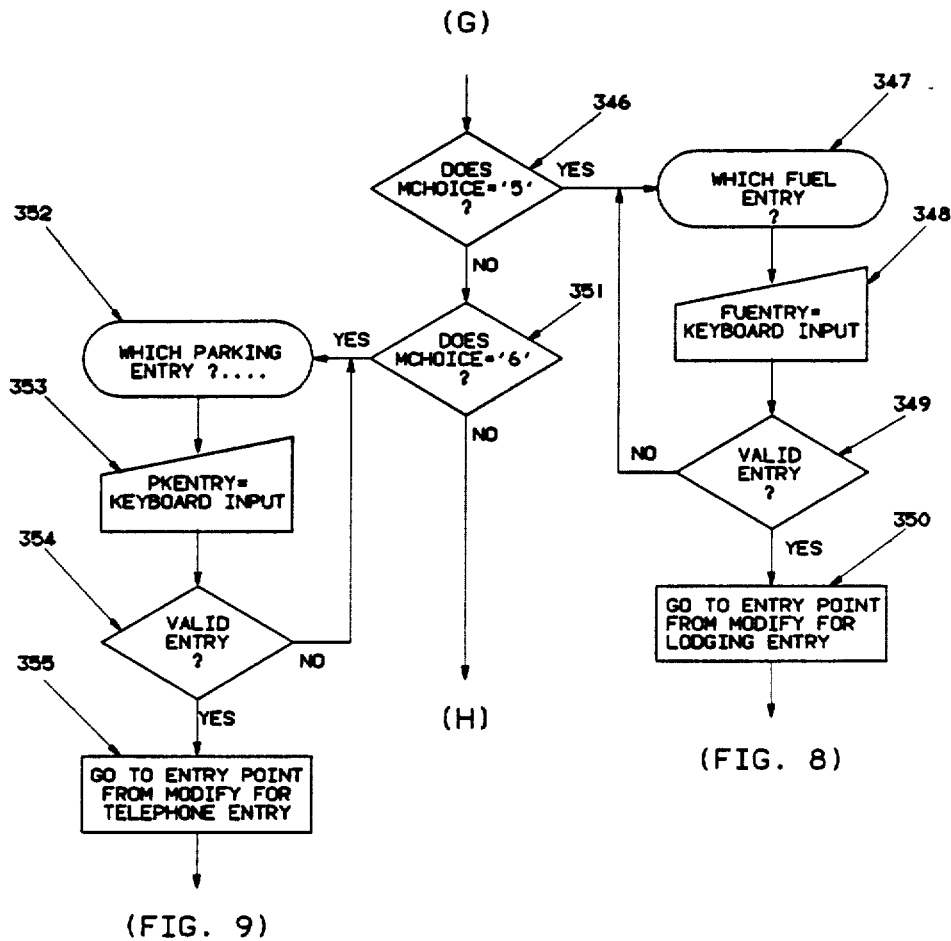
Figure 20D:
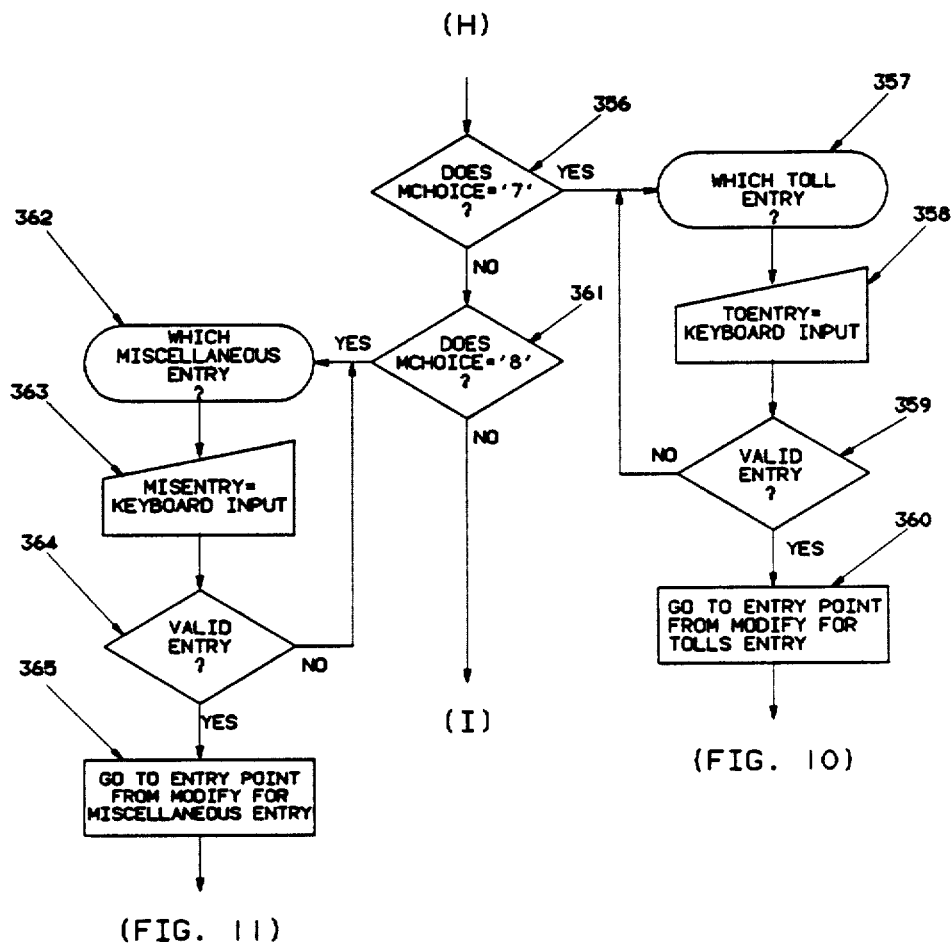
Figure 20E:
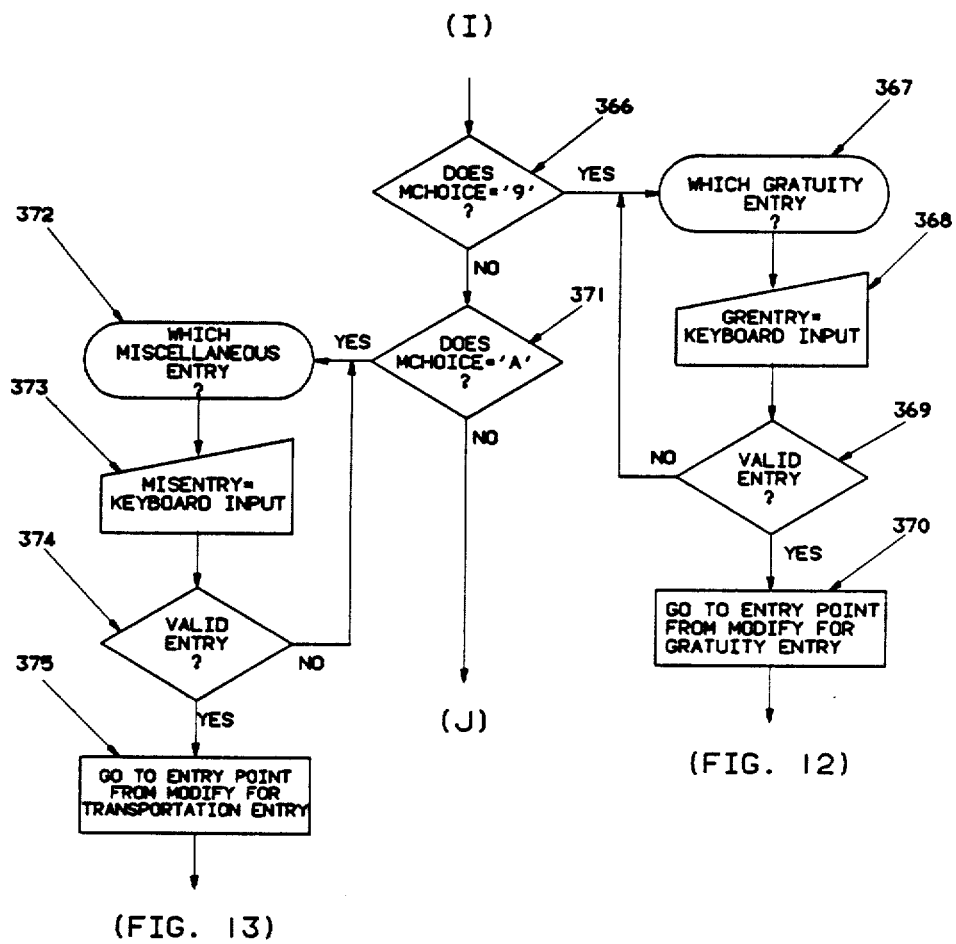
Figure 20F:
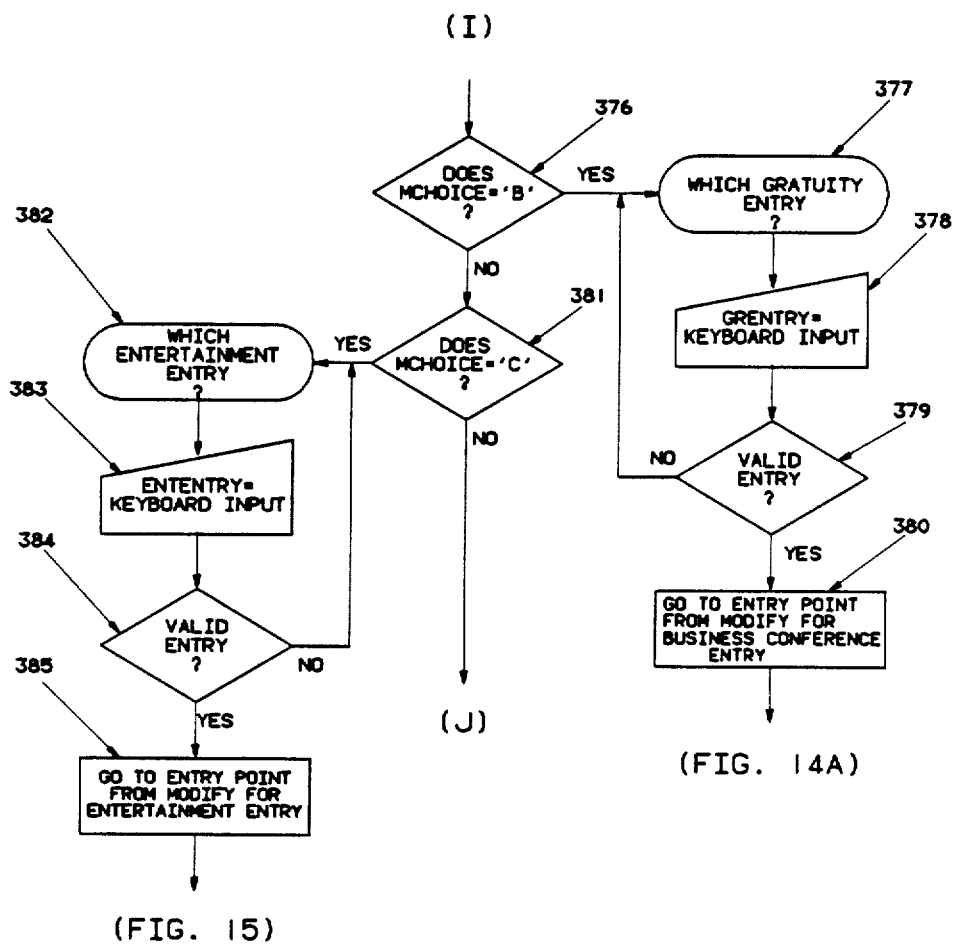

Returning to step 45 of FIG. 4A, either the mileage mode or the odometer mode has been selected upon reentry to the mileage routine and steps 46 and 47 are completed to enter step 60 of FIG. 4B. It should be noted that at this point the entries from the modify routine 23 of FIG. 1 can be made, as shown in FIG. 20A at step 331. At step 60 when the odometer mode has been selected, steps 61, 62 and 63 are entered to transform the odometer readings into actual mileage readings. At step 63 if the new odometer reading is not greater than the odometer reading, a mistake has been made and step 64 is entered to recycle the system to step 61 to enter the new odometer reading again. At step 63 when the new odometer reading accepts the previously stored odometer reading, step 65 is entered to set the stored odometer reading as the base which is used for calculating mileage for subsequent entries. When this step is completed the user is prompted at step 69 to enter the reason for the mileage traveled. At step 70 the user actually enters the text for the mileage.

Returning to step 60 when the mileage mode is entered and selected step 67 is entered to input the mileage traveled to the system, as indicated by the keyboard entry at step 68. Step 69 is then entered so that the reason for the trip can be entered to the system. Steps 70 through 78 are then entered to calculate the mileage expense and provide the calculation as a portion of the permanent record. At step 77 the user is instructed to depress a key to continue selecting other modules and at step 78 when such a key has been depressed the main menu is entered as indicated by the identifier A.

Figure 5A:
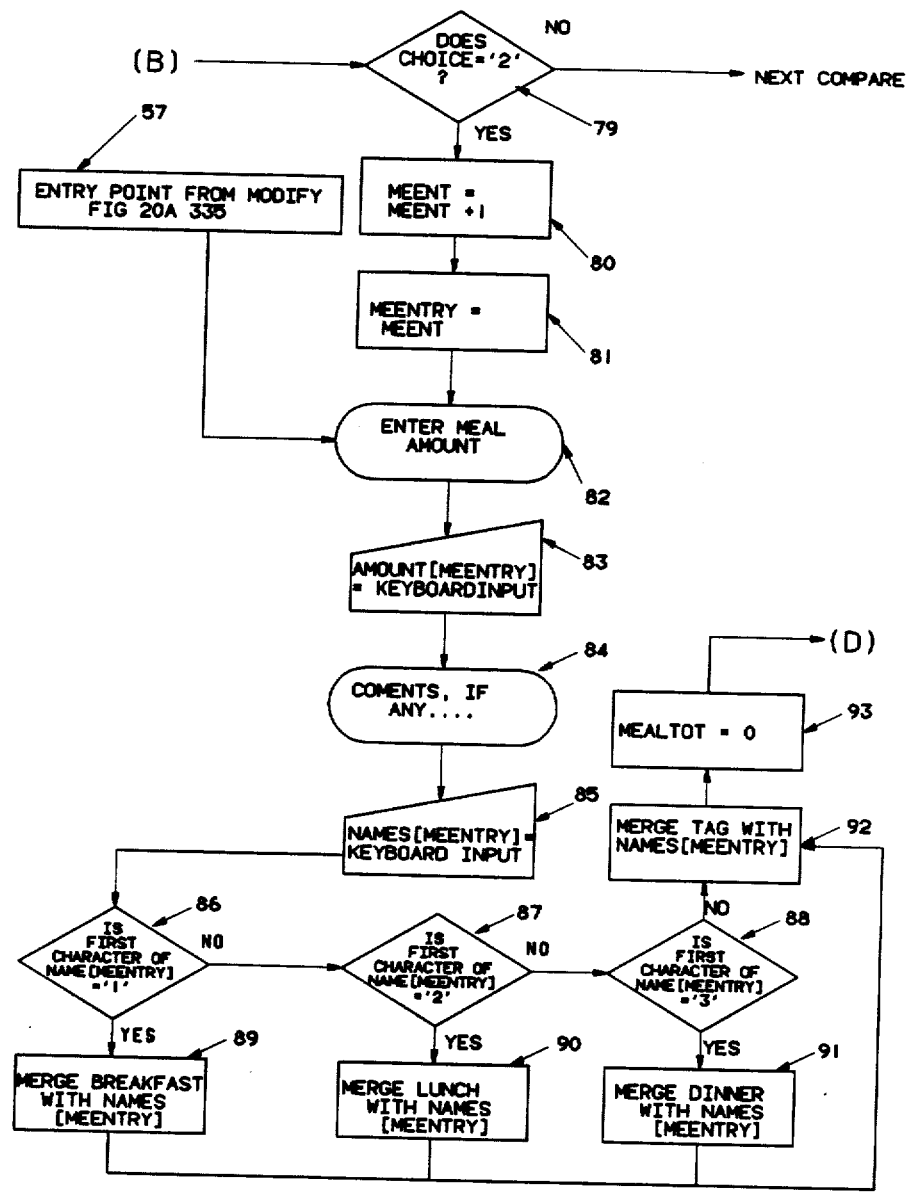
FIGS. 5a and 5b are a flow chart of the meals routine.
Figure 5B:
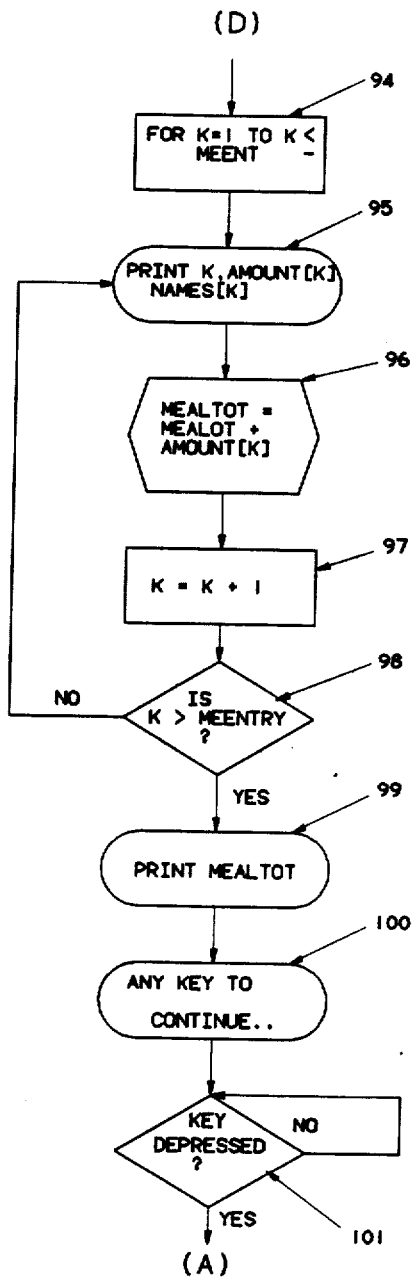

FIGS. 5A and 5B are a flow chart for the meals module 12 of FIG. 1. Step 79 is used to select the meal module and steps 80 through 83 provide an entry for the cost of the meal being entered. Again, step 57 is available to enter the meal routine from the modify routine 23 of FIG. 1, and as shown in FIGS. 20A at step 335. Step 83 is available for the user to enter the cost of the meal. Step 85 constitutes a keyboard entry and the user can respond with a carriage return or input any comments relative to the entry. Alternatively the user can identify the meal as breakfast, lunch or dinner by inputting the character 1, 2 or 3 as indicated at steps 86, 87 and 88 respectively. Steps 89, 90 and 91 are used to merge the inputs with the entries for 86, 87 and 88 respectively. At steps 92 the tag previously input by the user in the tag routine will be merged. Step 93 is then entered to total the expenses for all the meals entered. Steps 94 through 101 of FIG. 5b are then entered as indicated by the identifier D to permanently store the meal entry and to enable the user to return to the main menu 10 of FIG. 1 as indicated by the identifier A at the bottom of the flow chart. Important variables utilized in the meal routine are defined in Table 2.

TABLE 2

IMPORTANT VARIABLES UTILIZED BY THE MEALS ROUTINE

| VARIABLE | TYPE | USAGE |
| --- | --- | --- |
| meent | integer | counter for the actual number of meal entries |
| meentry | integer | counter for the present meal entry |
| amount | real | cost of the meal |
| mealtot | real | total cost for meals |
| Specifier | character | text for the meal entry or system generated description; storage for 50 entries each having a maximum of 80 characters |
| K | integer | used to point to meal entry variables for display after entries are made |

Figure 6:
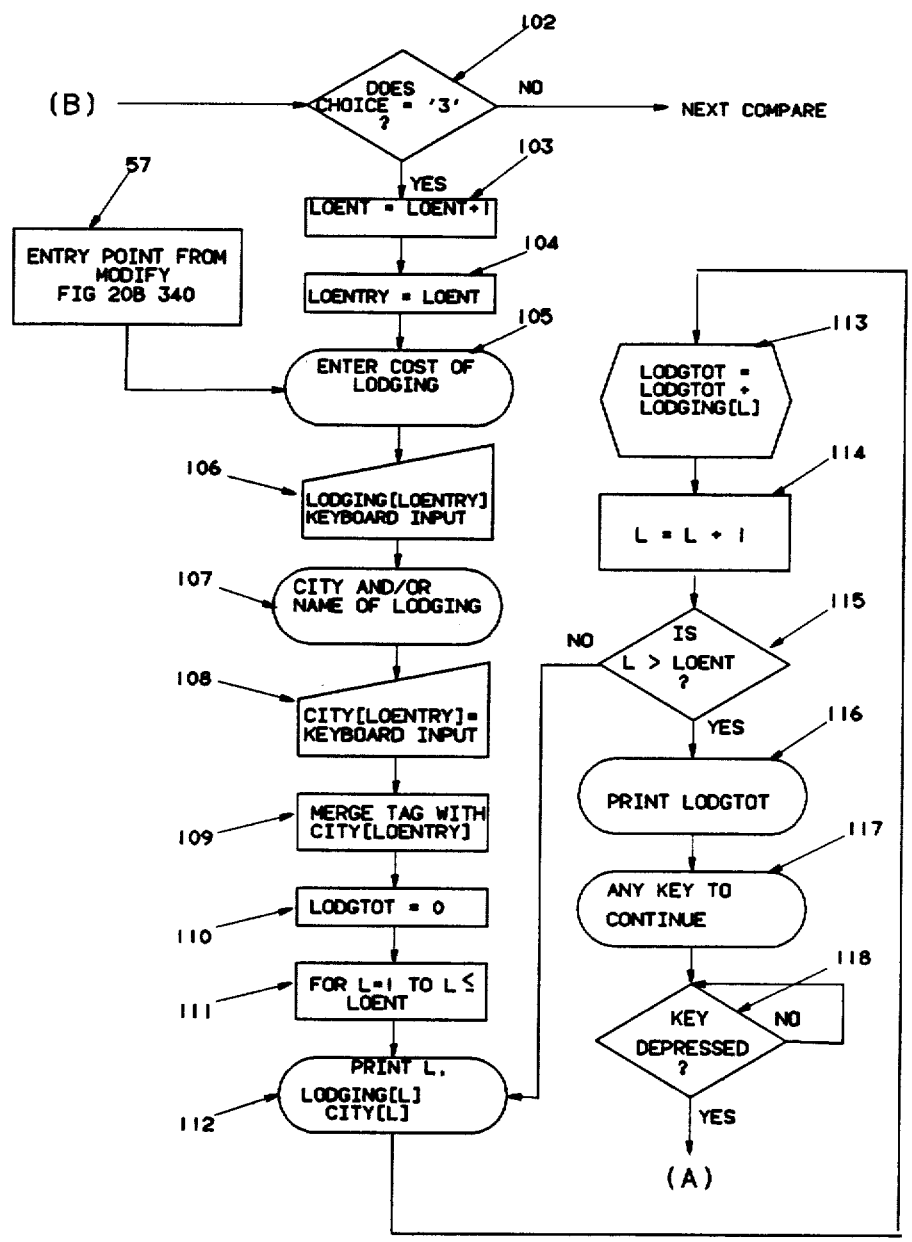
FIG. 6 is a flow chart of the lodging routine.

FIG. 6 is a flow chart for the lodging module 13 at FIG. 1. The routine is entered at step 102 by pressing the number 3 identifier of the main menu 10. Important variables for the lodging entry are shown in Table 3.

TABLE 3

IMPORTANT VARIABLES UTILIZED BY THE LODGING ROUTINE

| VARIABLE | TYPE | USAGE |
| --- | --- | --- |
| loent | integer | counter for the actual number of lodging routines |
| loentry | integer | counter for the present lodging entry |
| lodging | real | cost of each lodging entry; space reserved for 50 entries |
| lodgtot | real | total cost for lodging |
| city | character | text for the city and/or hotel name/names; storage for 50 entries each having a maximum of 80 characters |
| L | integer | used to point to lodging variables for display after entries are made |

Step 103 is the loent entry and is the counter for the actual number of lodging entries. Step 104 is the loentry and enters the counter for the present lodging entry. At step 105 the user is prompted to enter the cost of lodging. Step 105 also serves as the entry point for the modify routine 57, as shown in FIG. 20A step 340. At step 106 the lodging cost is entered by the user and the entry is stored in the array called "Lodging". The position in the array is determined by the value of the "loentry" and thus causes the lodging to enter into memory location "Lodging {loentry}". At step 108 the users response to the prompting for an entry is stored in memory location "City {loentry}". At step 109 the tag merges with the text string "City {loentry}" to store the revised text in "City {loentry}". At step 110 the total for all lodging entries is set equal to zero. The purpose of this is to ensure that a correct total is input should the user enter the lodging function from the modify function. Each time the lodging function is called and exited the total is updated. Also, at step 112 a log of all the lodging entries is displayed along with the associated text including the tags and the total lodging cost as calculated in step 113. Steps 117 through 118 prompt the user to exit the lodging routine by pressing any key to return to the main menu, as indicated by the identifier A at the bottom of the flow chart.

Figure 7:
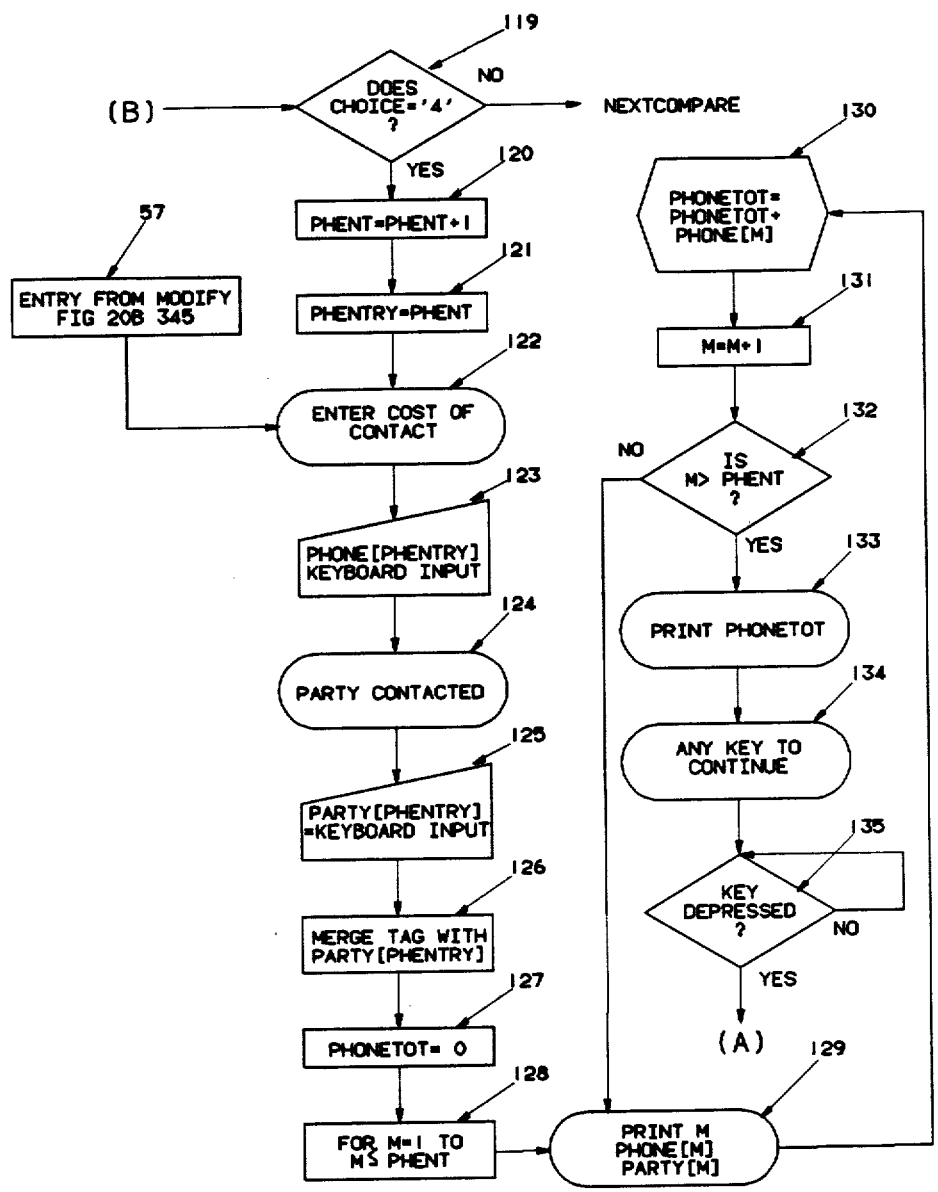
FIG. 7 is a flow chart of the telephone routine.

FIG. 7 is a flow 1 of the telephone module 14 of FIG. 1. This module is selected by pressing the number 4 key. This flow chart is identical to the lodging routine flow chart of FIG. 6 and therefore need not be described in detail. However, the important variables utilized in the telephone routine 14 as shown in Table 4. VARIABLES

TABLE 4

IMPORTANT VARIABLES UTILIZED BY THE TELEPHONE ENTRY ROUTINE

| VARIABLE | TYPE | USAGE |
| --- | --- | --- |
| phent | integer | counter for the actual number of phone entries |
| phentry | integer | counter for the present lodging entry |
| phone | real | cost of each lodging entry; space reserved for 50 entries |
| phonetot | real | total cost for calls |
| party | character | text for the name of the company, firm, person, etc. Storage space for 50 entries each having a maximum of 80 characters |
| m | integer | used to point to phone entry variables for display after |

TABLE 4-continued
IMPORTANT VARIABLES UTILIZED BY THE TELEPHONE ENTRY ROUTINE

| VARIABLE | TYPE | USAGE |
| --- | --- | --- |
| | | entries are made. |

Figure 8:
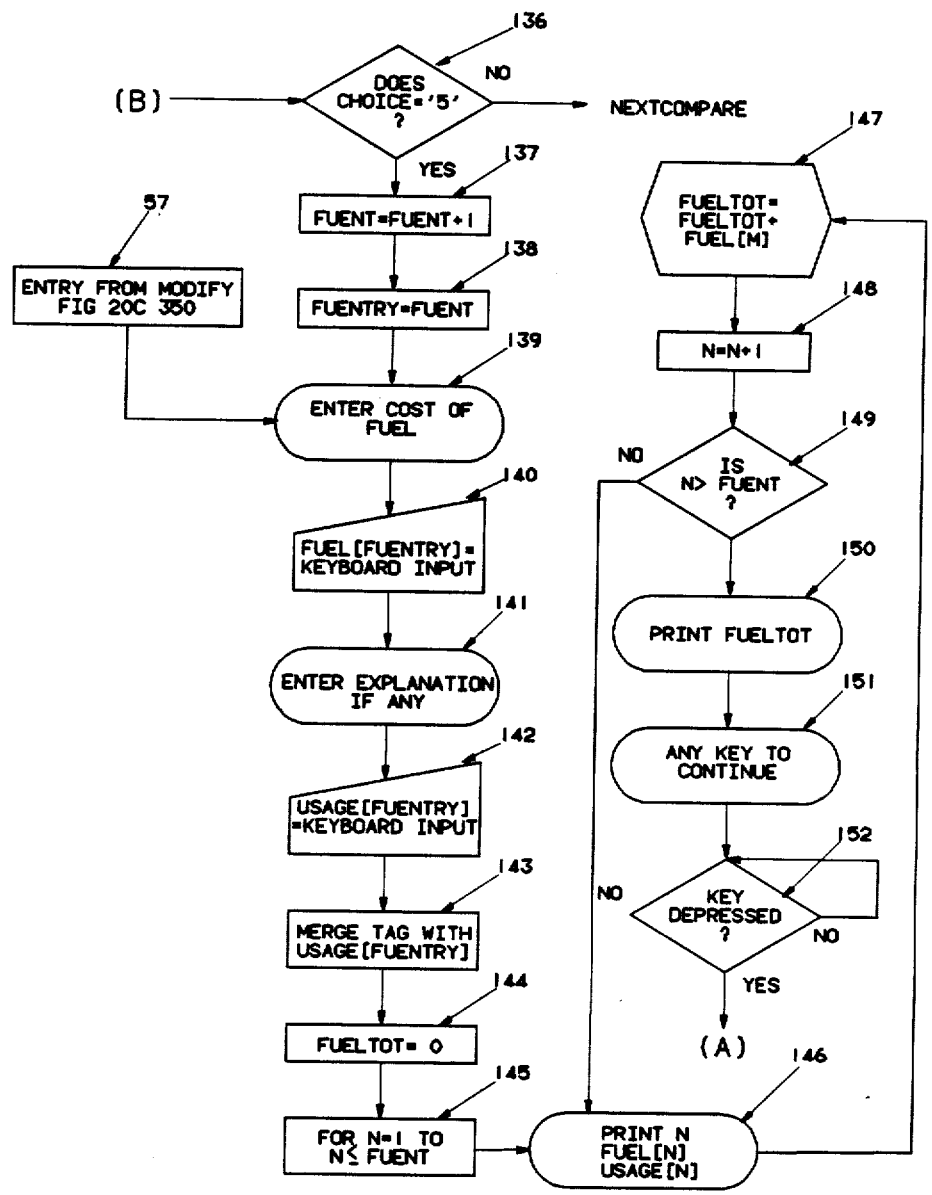
FIG. 8 is a flow chart of the fuel routine.

FIG. 8 is a flow chart of the fuel module 15 of FIG. 1. The module is selected by pressing the number 5 key. This flow chart also is identical to the lodging routine flow chart of FIG. 6 and the important variables utilized by the routine are shown in Table 5.

TABLE 5
IMPORTANT VARIABLES UTILIZED BY THE FUEL ROUTINE

| VARIABLE | TYPE | USAGE |
| --- | --- | --- |
| fuent | integer | counter for the actual number of fuel entries |
| fuentry | integer | counter for the present lodging entry |
| fuel | real | cost of each fuel entry; space is reserved for 50 entries |
| fueltot | real | total cost of fuel |
| usage | character | text for the reason for the fuel usage or item cost; space is reserved for 50 entries each having a maximum of 80 characters |
| n | integer | used to point to the fuel entry variables for display after fuel entries are made |

Figure 9:
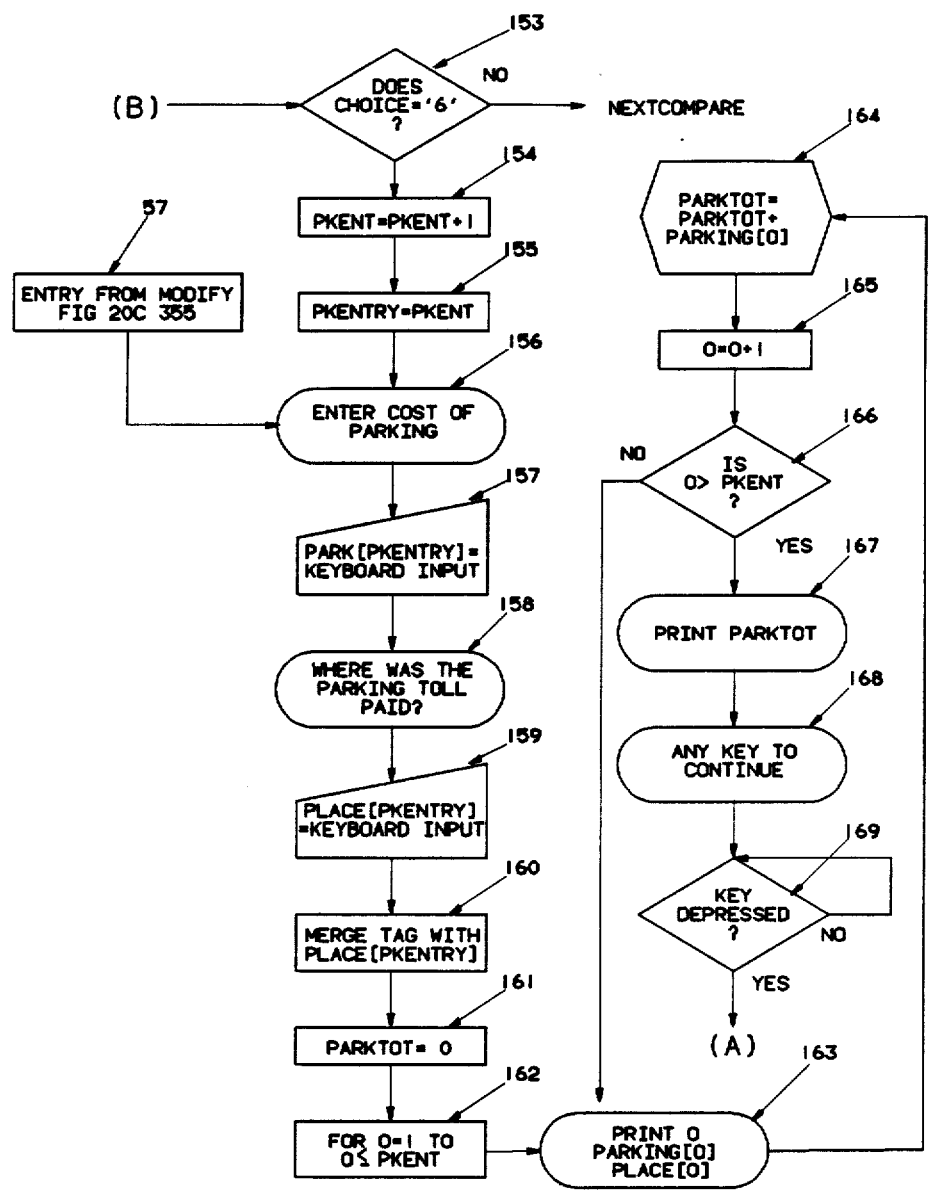
FIG. 9 is a flow chart of the parking routine.

FIG. 9 is a flow chart of the parking module 16 of FIG. 1. The module is selected by pressing the number 6 key on the keyboard. This flow chart also is identical to the lodging flowchart of FIG. 6 and the important variables are defined in Table 6.

TABLE 6
IMPORTANT VARIABLES UTILIZED BY THE PARKING TOLL ROUTINE

| VARIABLE | TYPE | USAGE |
| --- | --- | --- |
| pkent | integer | counter for the actual number of parking tolls entered |
| pkentry | integer | counter for the present parking toll entry |
| parking | real | cost of each parking entry; space reserved for 50 entries |
| parktot | real | total cost of parking tolls |
| place | character | text for the name of the place where the parking toll was paid |
| 0 | integer | used to point to the parking variables for display after entries are made |

Figure 10:
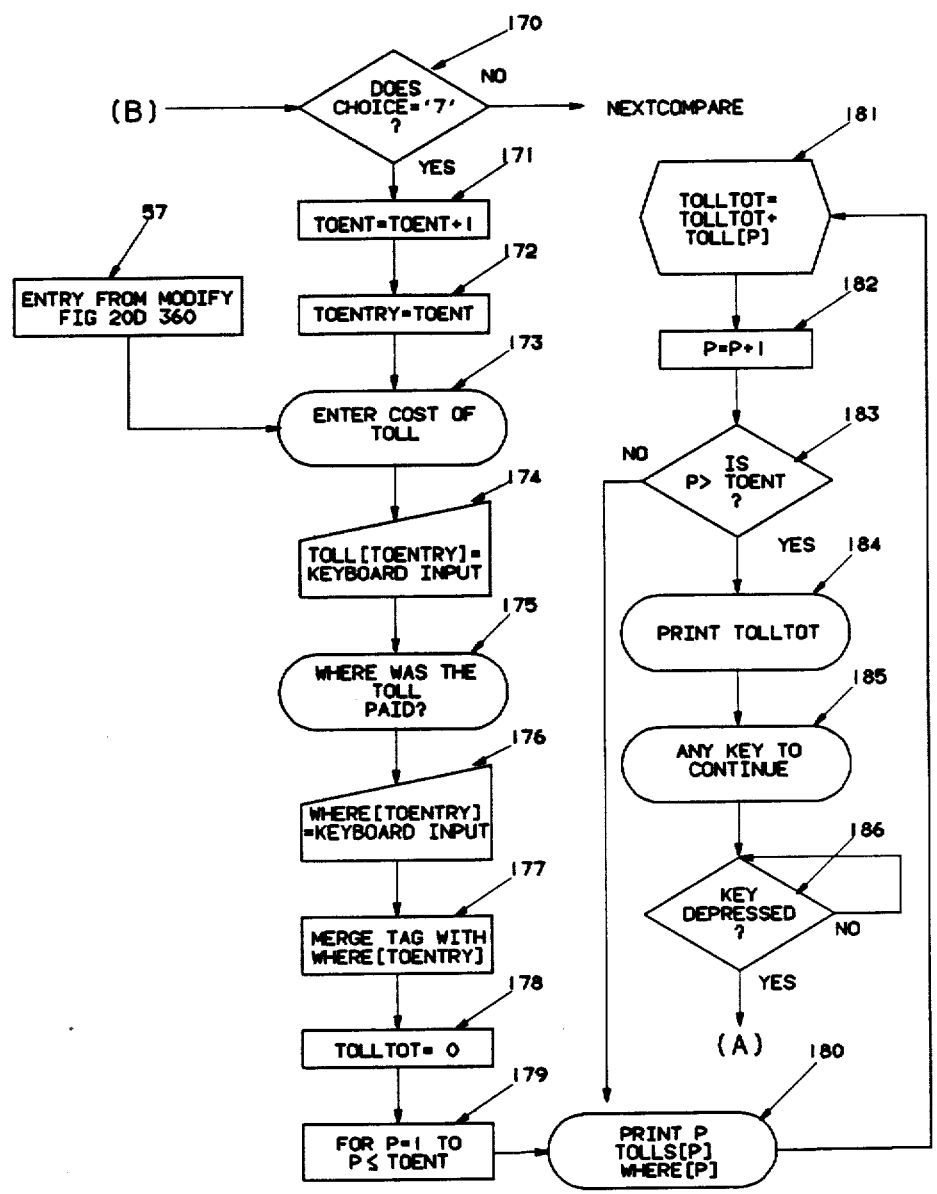
FIG. 10 is a flow chart of the toll routine.

FIG. 10 is a flow chart of the toll module 17 of FIG. 1. This module is selected by pressing the number 7 key. This flow chart also is identical to the lodging routine flow chart of FIG. 6 and the important variables utilized in the toll entry routine are defined in Table 7.

TABLE 7
IMPORTANT VARIABLES UTILIZED BY THE TOLLS ROUTINE

| VARIABLE | TYPE | USAGE |
| --- | --- | --- |
| toent | integer | counter for the actual number of tolls entered |
| torntry | integer | counter for the present toll entry |
| tolls | real | cost of each toll entry |
| tollstot | real | total cost of tolls |
| where | character | text for the name of the place where the toll was paid or who was paid; storage for 50 entries each having a maximum of 80 characters |
| p | integer | used to point to the toll entry variable for display after toll entries are made |

Figure 11:
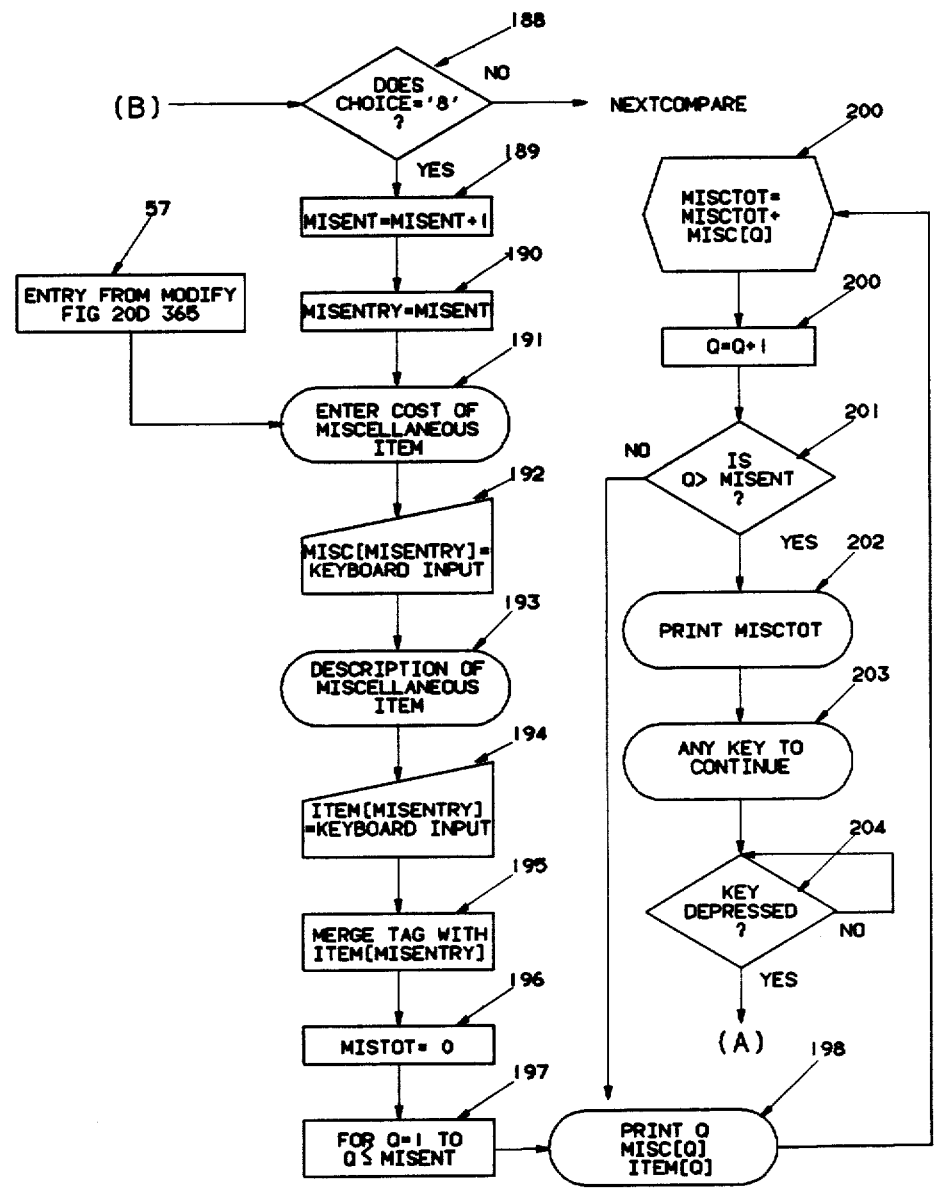
FIG. 11 is a flow chart of the miscellaneous entry routine.

FIG. 11 is a flow chart of the miscellaneous module 18 of FIG. 1. This flow chart also is identical to the lodging routine flow chart of FIG. 6 and the important variables utilized in the miscellaneous routine are defined in Table 8.

TABLE 8
IMPORTANT VARIABLES UTILIZED BY THE MISCELLANEOUS ROUTINE

| VARIABLE | TYPE | USAGE |
| --- | --- | --- |
| misent | integer | counter for the actual number of miscellaneous entries |
| misentry | integer | counter for the present miscellaneous entry |
| misc | real | cost of each miscellaneous entry |
| mistot | real | total cost of miscellaneous items |
| item | character | description of the individual miscellaneous item; storage for 50 entries each having a maximum of 80 characters |
| Q | integer | used to point to the miscellaneous entry variable for display after miscellaneous entries are made |

Figure 12:
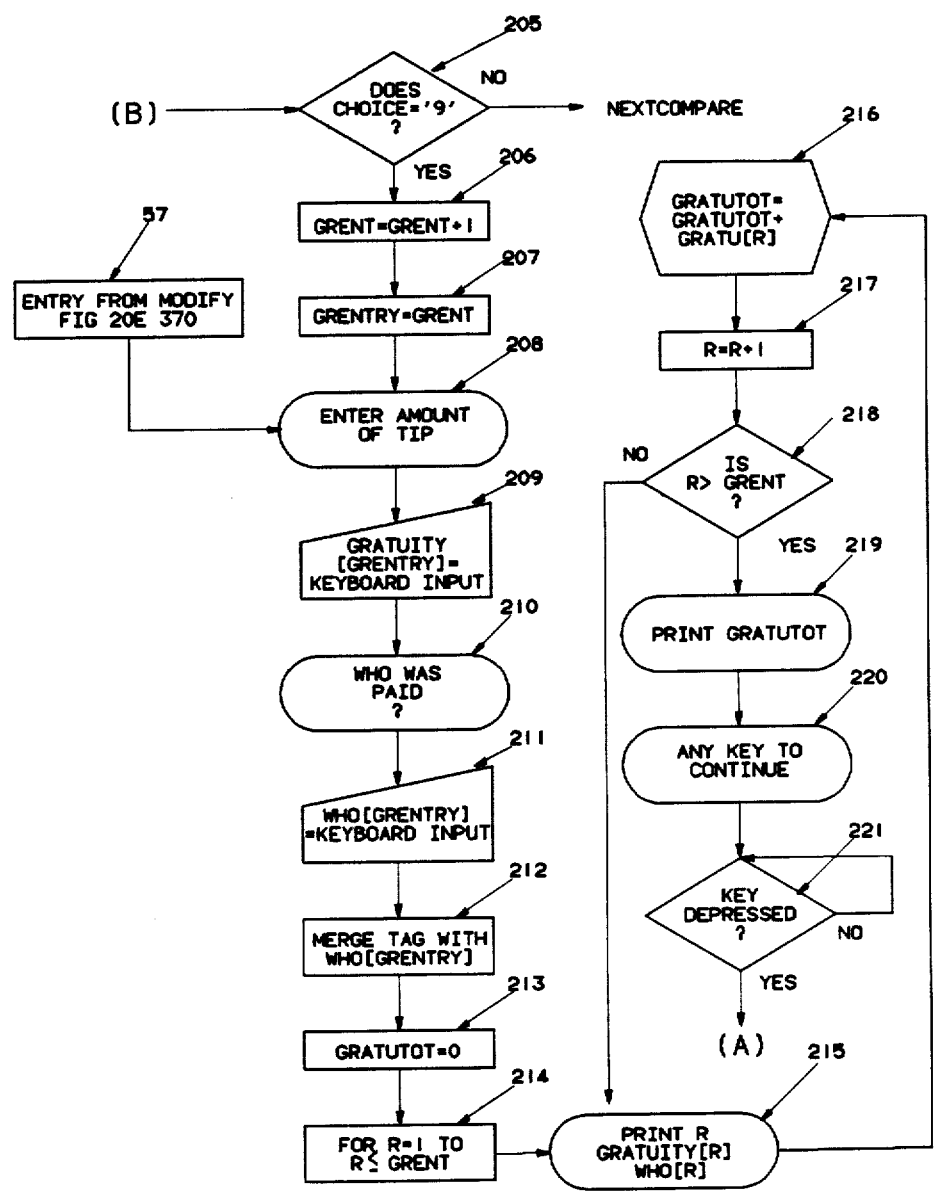
FIG. 12 is a flow chart of the gratuity routine.

FIG. 12 is a flow chart of the gratuity module 19 of FIG. 1. This flow chart also is identical to the lodging routine flow chart of FIG. 6 and the important variables utilized are defined in Table 9.

TABLE 9
IMPORTANT VARIABLES UTILIZED BY THE GRATUITY ROUTINE

| VARIABLE | TYPE | USAGE |
| --- | --- | --- |
| grent | integer | counter for the actual number of gratuity entries |
| grenty | integer | counter for the present gratuity entry |
| gratuity | real | amount of gratuity paid |
| gratutot | real | total amount of gratuity paid |
| who | character | text description of who was paid or where the gratuity was paid; storage for 50 entries each having a maximum of 80 characters |
| R | integer | used to point to the gratuity entry variable for display after gratuity entries are made |

Figure 13:
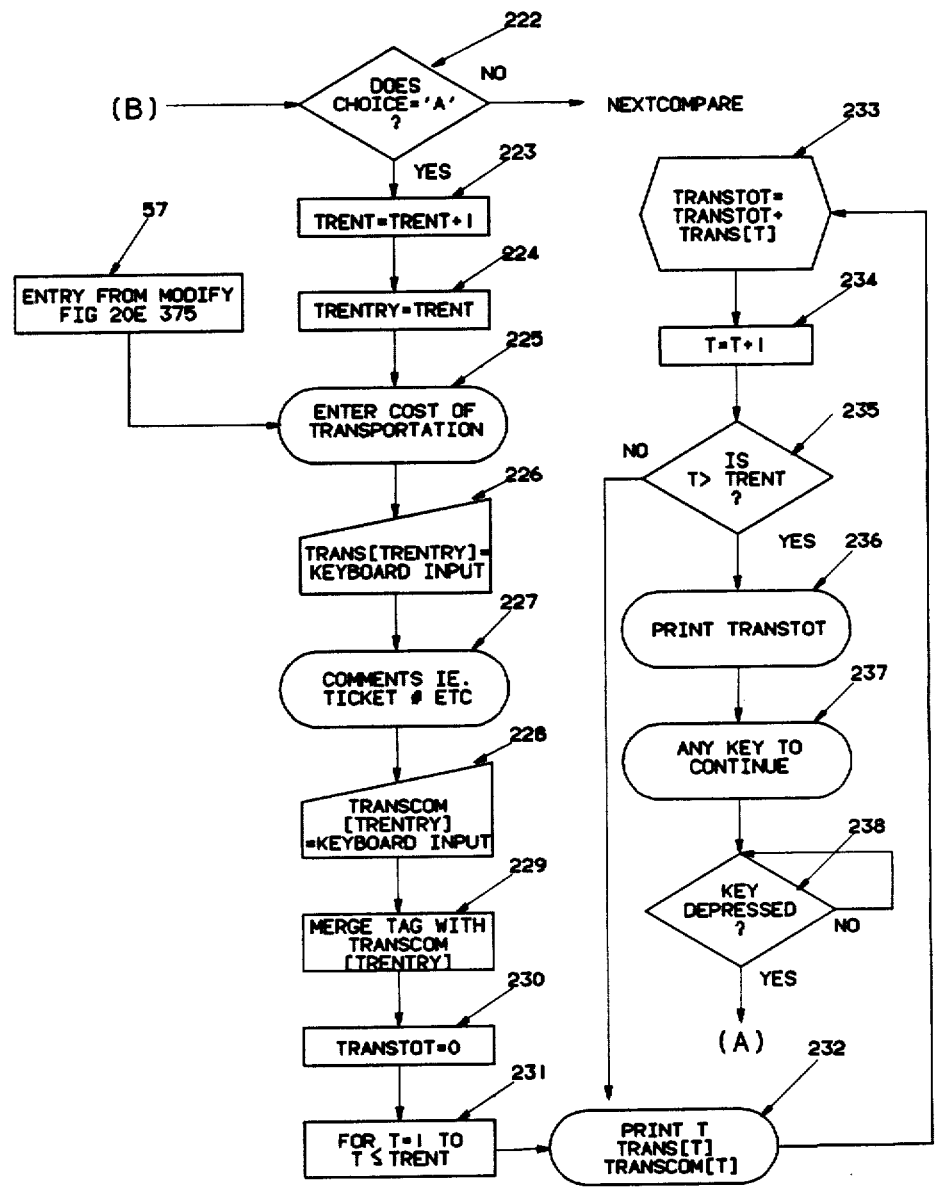
FIG. 13 is a flow chart of the transportation routine.

FIG. 13 is a flow chart of the transportation module 20 of FIG. 1. This flow chart also is identical to the lodging routine flow chart 13 of FIG. 6 and important variables are defined in Table 10.

TABLE 10
IMPORTANT VARIABLES UTILIZED BY THE TRANSPORTATION ROUTINE

| VARIABLE | TYPE | USAGE |
| --- | --- | --- |
| trent | integer | counter for the actual number of transportation entries |
| trentry | integer | counter for the present transportation entry |
| trans | real | cost of the individual transportation entry |

TABLE 10-continued
IMPORTANT VARIABLES UTILIZED BY THE TRANSPORTATION ROUTINE

| VARIABLE | TYPE | USAGE |
|---|---|---|
| transtot | real | total transportation cost |
| transcom | character | text description of the transportation cost, air-line ticket number, rental car agreement number, etc.; storage for 50 entries each having a maximum of 80 characters |
| T | integer | used to point to the transportation variable for display after the transportation entries are made |

Figure 14A:
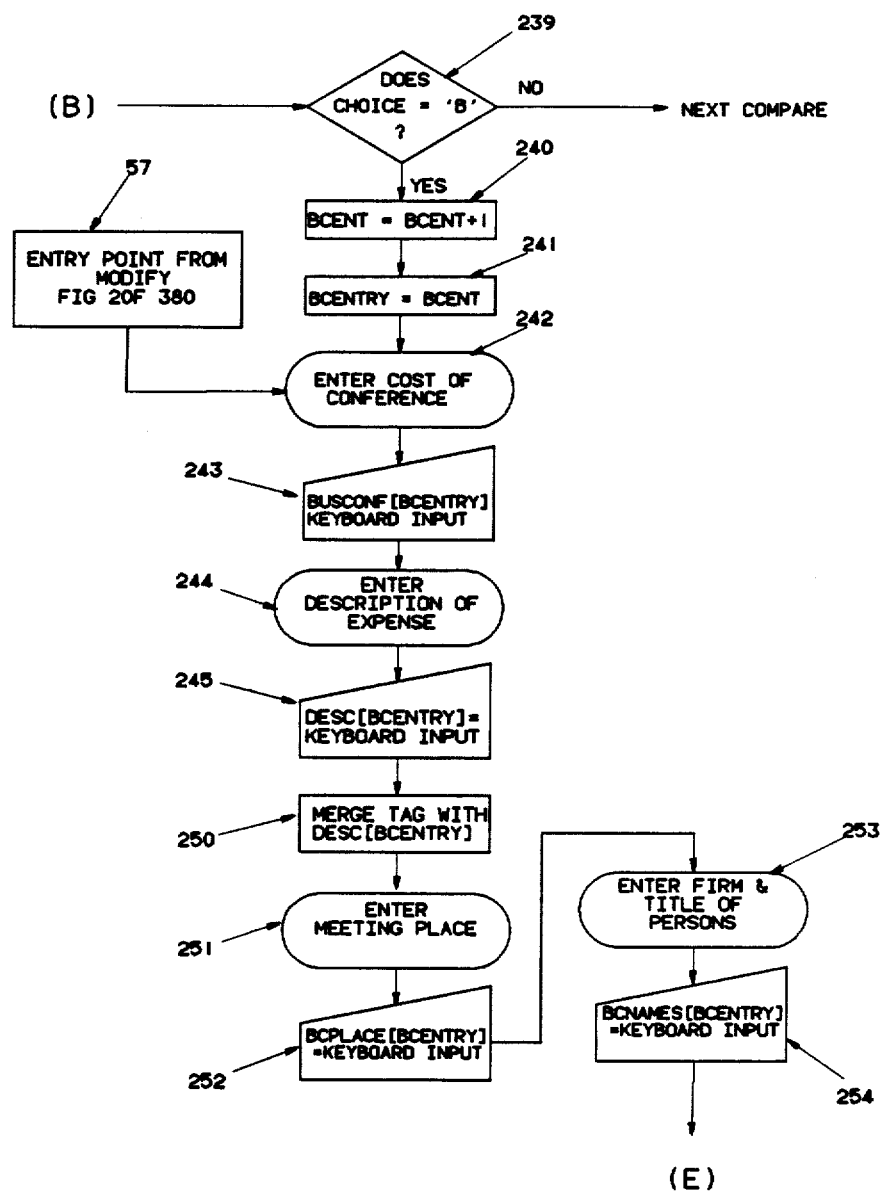
FIGS. 14a and 14b are a flow chart of the business conference routine.
Figure 14B:
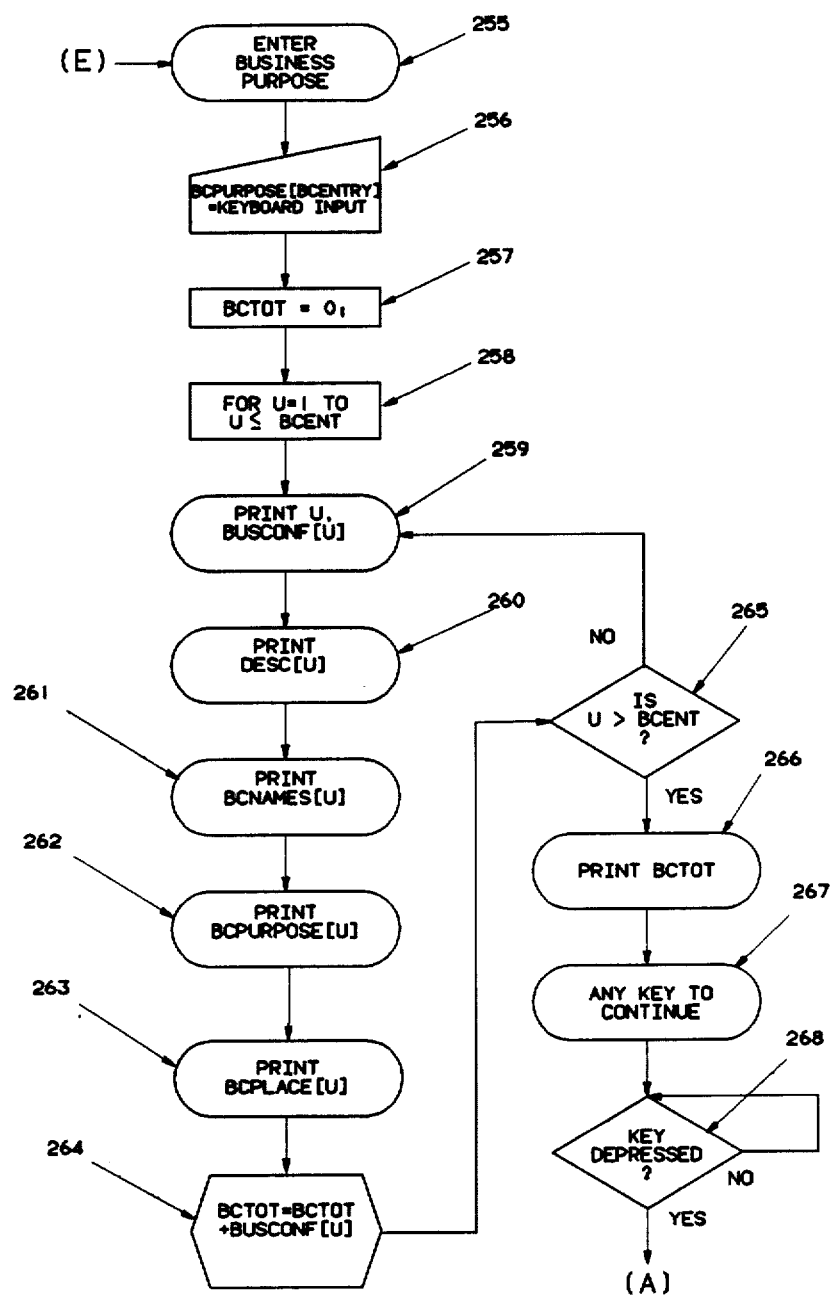

FIGS. 14A and 14B are a flow chart of the business conference module 21 of FIG. 1. Important variables utilized in the business conference routine 21 are defined in Table 11.

TABLE 11
IMPORTANT VARIABLES UTLIZED BY THE BUSINESS CONFERENCE ROUTINE

| VARIABLE | TYPE | USAGE |
|---|---|---|
| bcent | integer | counter for the actual number of business conferences |
| bcentry | integer | counter for the present business conferency entry |
| busconf | real | cost of the business conference |
| bctot | real | total for business conferences |
| desc | character | text description of the conference; storage for 50 entries each having a maximum of 80 characters |
| bcplace | character | text description of the conference meeting place; storage for 50 entries each having a maximum of 80 characters |
| bcnames | character | names of the conference attendees; storage for 50 entries each having a maximum of 80 characters |
| bcpurpose | character | text description of the conference purpose; storage 50 entries each having a maximum of 80 characters |
| U | integer | used to point to the business conference entry variables for display after entries are made |

There are a plurality of unique features of the business conference routine 21. Step 245 permits the entry of a description of the business conference. Fifty different entries can be made and each of the entries can have a maximum of eighty characters, thereby providing substantial space for a full description of the conference. Step 252 permits the input of a text description of the meeting place. Step 245 permits all entries utilized to be identified with the names of the persons attending the conference. Step 256, FIG. 14B, permits the entry of a text description describing the purpose of the conference.

Figure 15:
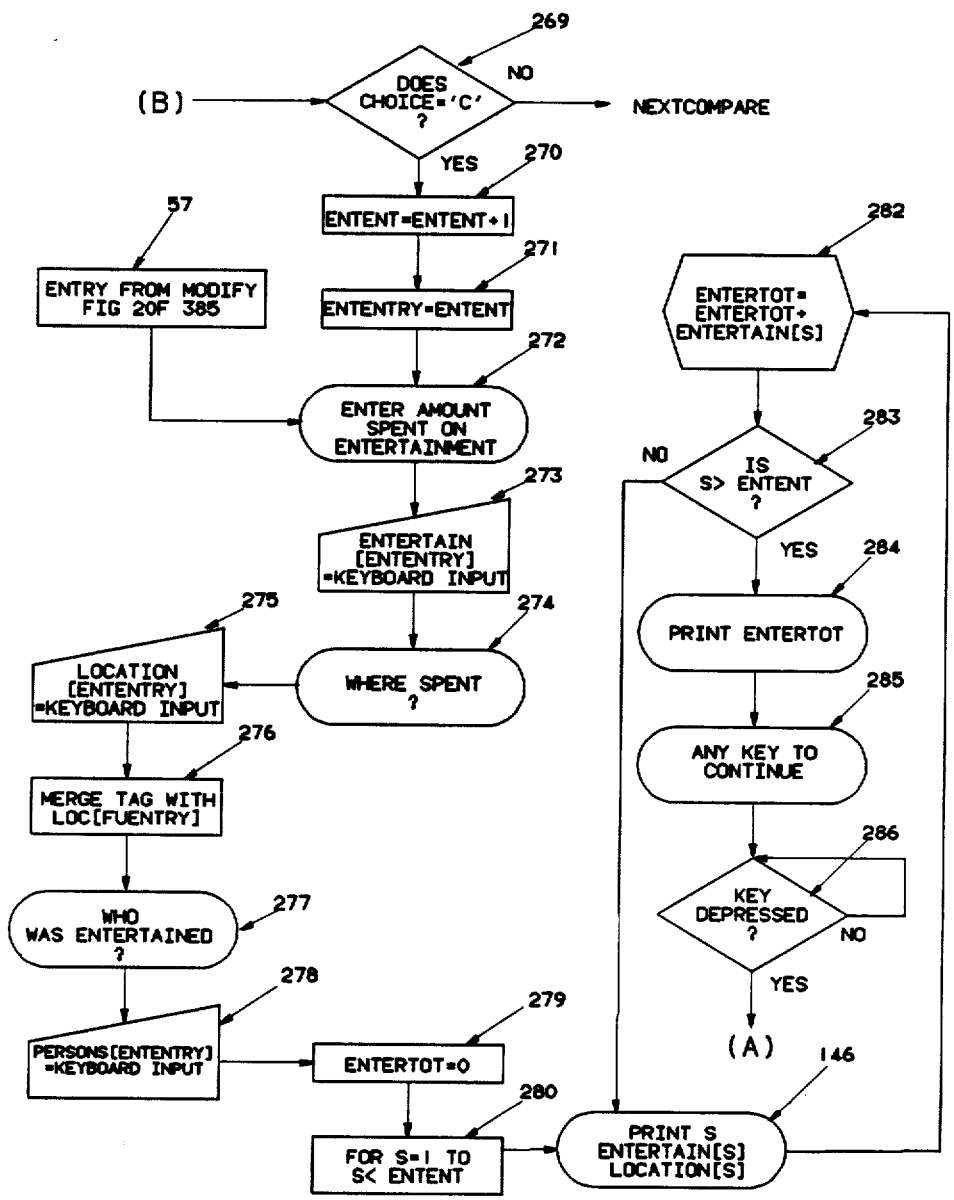
FIG. 15 is a flow chart of the entertainment routine.

FIG. 15 is a flow chart for the entertainment module 22 of FIG. 1. This flow chart also is identical to the lodging routine flow chart of FIG. 6. Important variables utilized in the entertainment routine are defined in Table 12.

TABLE 12
IMPORTANT VARIABLES UTILIZED BY THE ENTERTAINMENT ROUTINE

| VARIABLE | TYPE | USAGE |
|---|---|---|
| entent | integer | counter for the actualnumber of entertainment entries |
| ententry | integer | counter for the present entertainment entry |
| entertain | real | cost of entertainment entry |
| entertot | real | total for entertainment |
| location | character | text, location of the entertainment; storage for 50 entries each having a maximum of 80 characters |
| persons | character | text, names of the people entertained; storage for 50 entries each having 80 characters |
| S | integer | used to point to the entertainment variable for display after entries are made |

Figure 16:
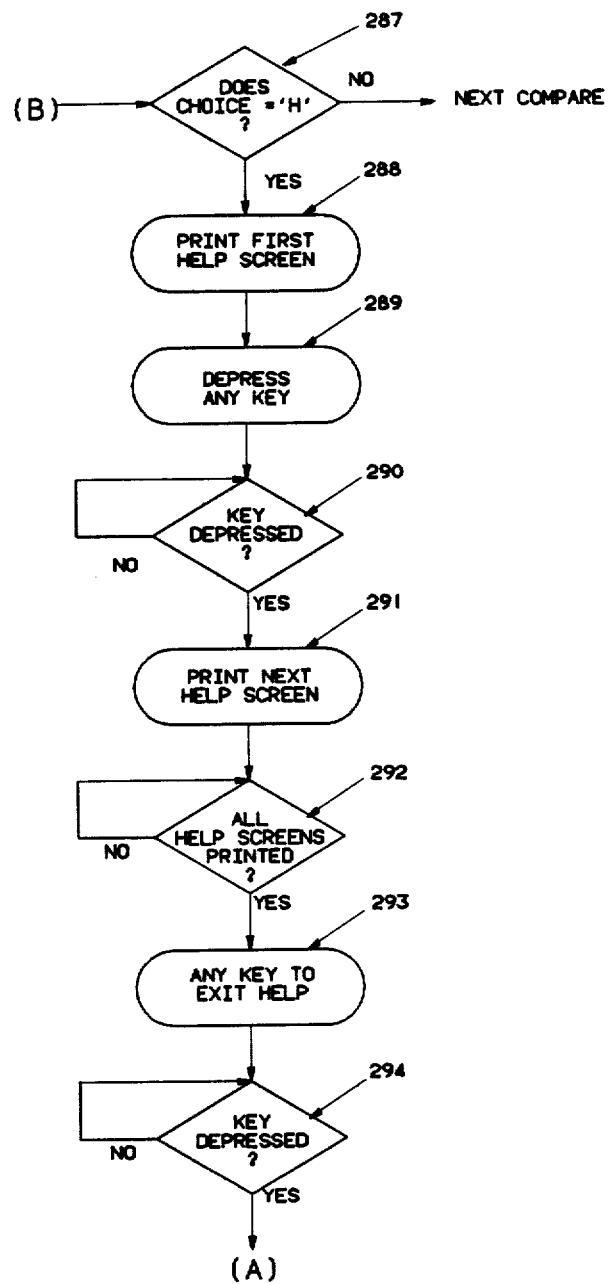
FIG. 16 is a flow chart of the help routine.

FIG. 16 is a flow chart of the help module 29 of FIG. 1. The module is selected by pressing the letter identifier H key. The help routine is a standard type routine which instructs the user how to use various routines; such as how to make a hard copy, or how to enter the storage routine, or how to use the tag routine, etc.

Figure 17:
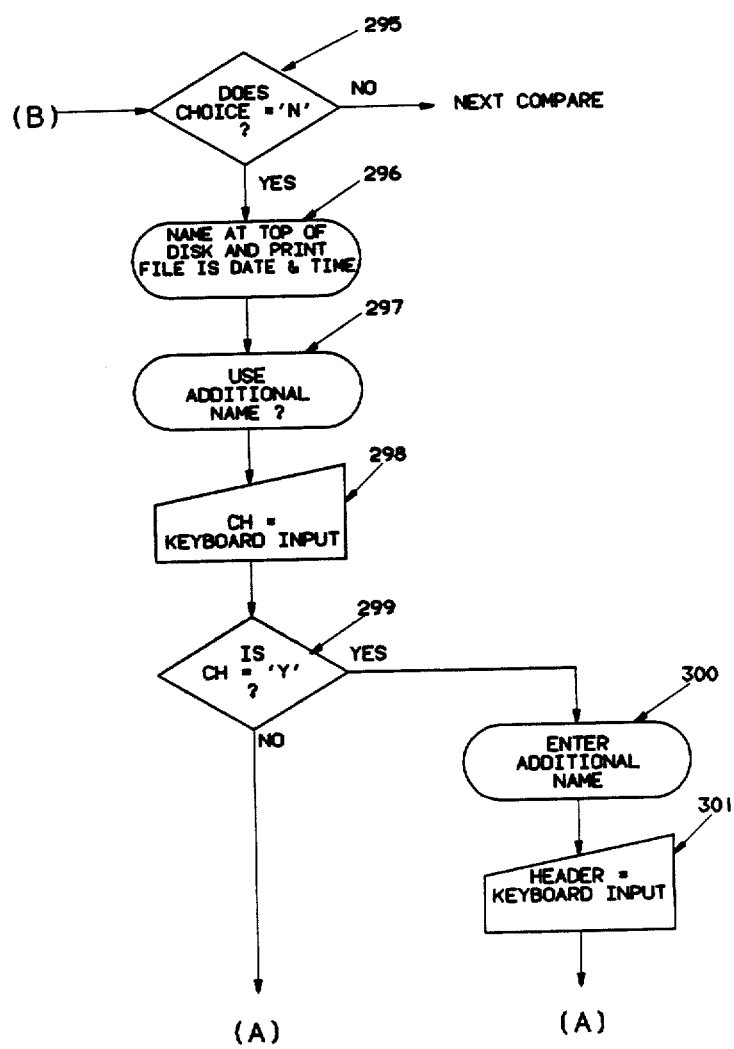
FIG. 17 is a flow chart of the name routine.

FIG. 17 is a flow chart of the name module 25 of FIG. 1. This module allows the user to enter a specialized title which will appear on printed reports, screen displays and disc sotrage reports. The title reports the date that the expense report was created. Through the selection of the name function the user can enter additional text which the system will use along with the title when reports are generated by the system. The name routine 25 is a broader aspect of the tag routine 28. For example, the name routine can be used to select a range of dates or events. At step 297 , the user is asked if additional text is to be entered. At step 298 CH is a variable representing the users response to the current question of step 297. At step 299 when no addition is to be made the main menu is returned to. When additional text is to be entered, the entry is made at step 301.

Figure 18:
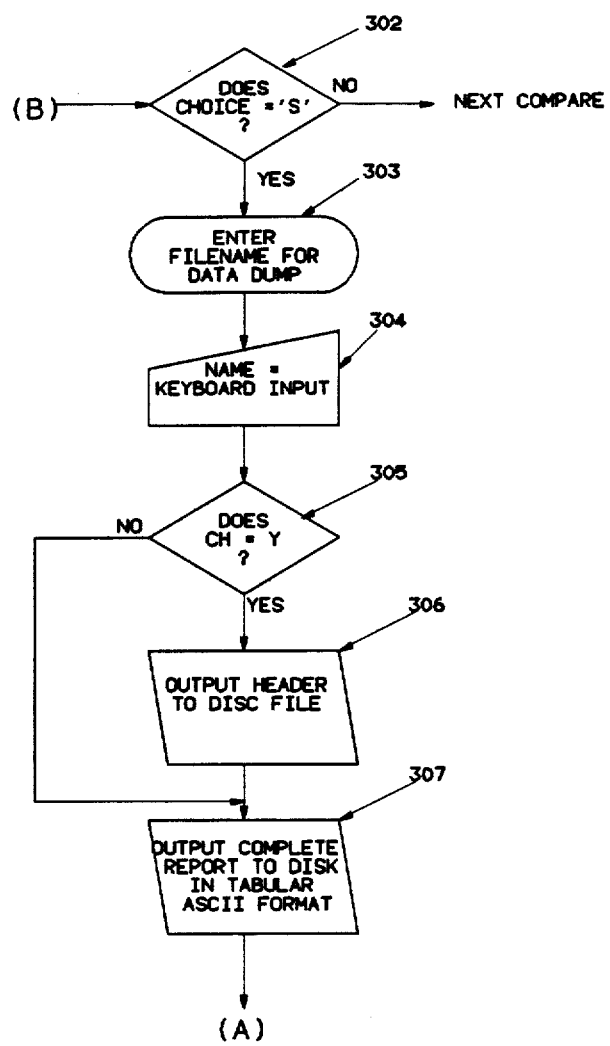
FIG. 18 is a flow chart of the save data routine.

FIG. 18 is a flow chart for the save operational assistance module 27 of FIG. 1. This routine enables the storage of the data entries on a disc.

Figure 19:
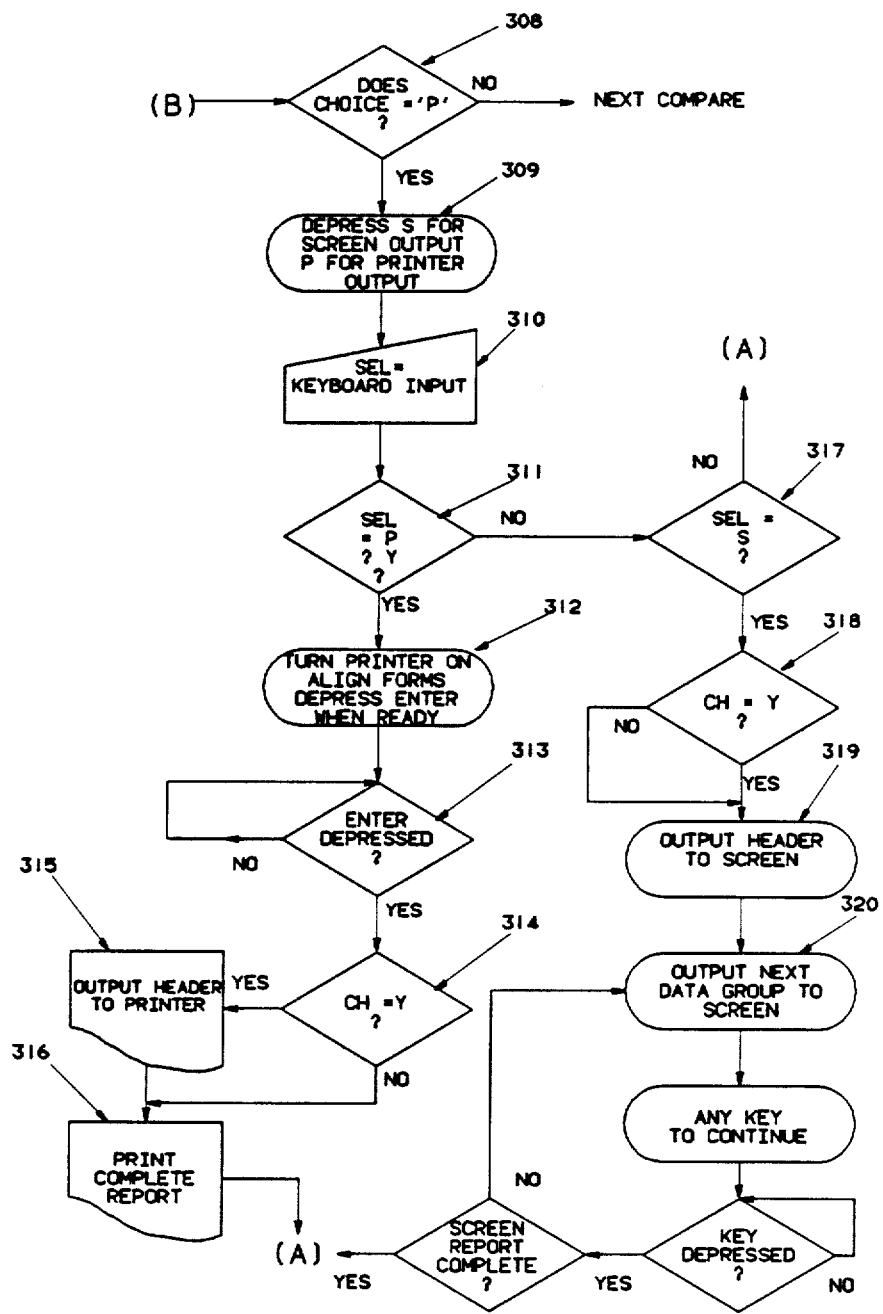
FIG. 19 is a flow chart of the print routine.

FIG. 19 is a flow chart for the print module 24 of the operational assistance routines of FIG. 1. After entering this routine, the operator is prompted at step 309 to select whether the data input should be displayed upon the monitor screen or output to a printer to provide a hard copy. In either event, steps 311 to 316 and 317 to 323 show the programming for the printer and screen display respectively.

FIGS. 20A through 20F are the flow chart of the modify module 23 of FIG. 1. The user selects the modify routine 23 by pressing the letter M key. The user is then prompted to select the modular expense routine to be modified by pressing the appropriate alpha-numeric identifier for that routine as shown in FIG. 1. For example, when the mileage routine is to be modified, step 326 of FIG. 20A is entered when the operator presses the keyboard button 1 which is the identifier for the mileage routine 11. The modify entry will then be made at step 57 of FIG. 4A and the user then makes the modifications in the same manner that entries are made upon the initial selection of the mileage routine 11. Step 327 of FIGURE 20A is entered when the modification is to be made to the meals expense routine 12 of FIG. 1. Steps 336, 341, 346, 351, 356, 361, 366, 371, 376 and 381 also permit the selection of the other expense routines 13 through 22 from the main menu of FIG. 10 by pressing the specific alpha-numeric identifier key which results in the selection of the desired routine.

After the selection of the routine to be modified the subsequent steps are shown in the flow chart of FIGS. 20A to 20F. Accordingly, when the mileage routine 11 of FIG. 1 is to be modified, steps 328 to 330 are used to effect the modification. Similarly, when the meals routine 12 is to be modified, steps 332 to 335 are used to effect the modifications. Thus the modification routine 23 is, in effect, a modular routine consisting of twelve identical subroutines.

Figure 21:
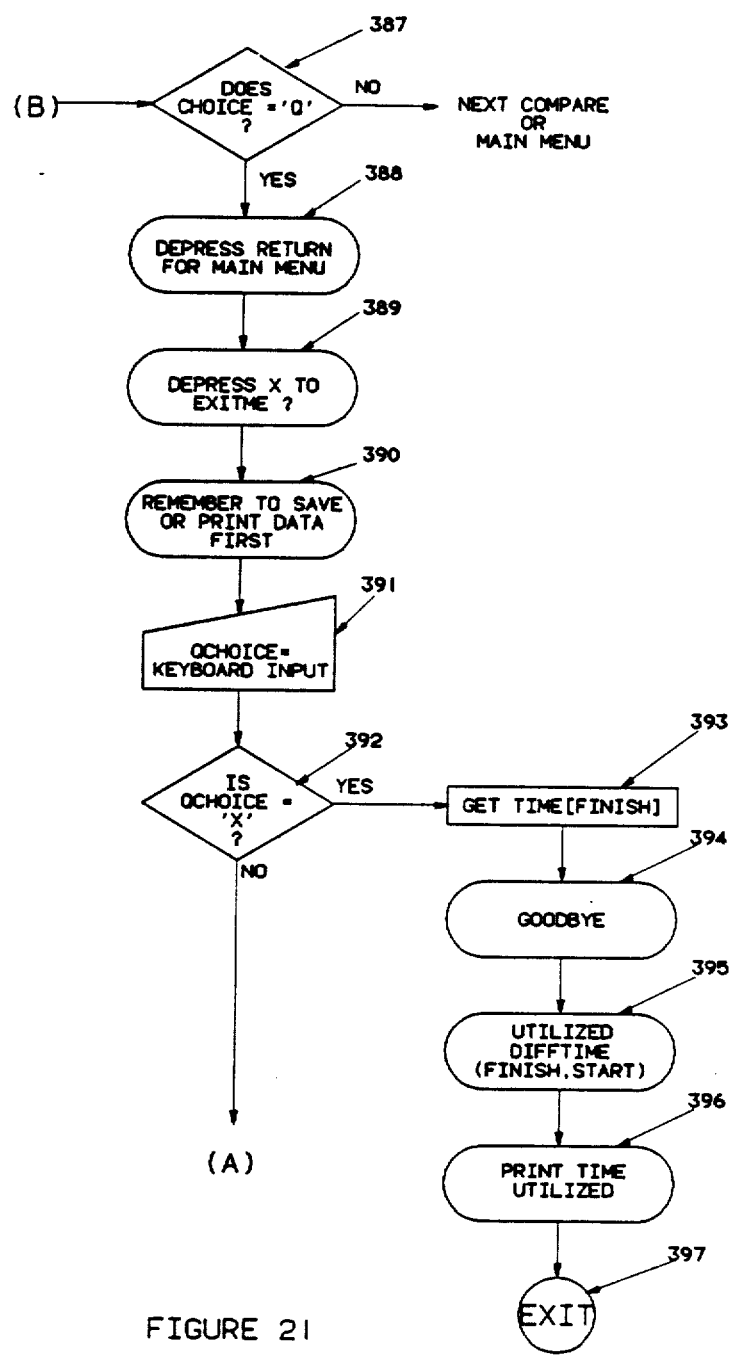
FIG. 21 is a flow chart of hte quit routine.

FIG. 21 is a flow chart of the quit module 26 of FIG. 1. This routine, as shown in the flow chart, permits the user to either go from one of the modular routines 11 through 29 to another routine or to exit the system when the user has completed making entries.

What is claimed is:

1. A method of calculating and storing business expenses comprising the steps of:
   storing a main menu of normal expense categories as separate modules in a data storage unit whereby additions to and deletions from said main menu are possible;
   providing each of said expense categories with an individual alpha-numeric identifier whereby each of said expense categories is available for selective call up and whereby entries to individual categories can be made without affecting other categories,
   providing a tag category in said main menu; whereby all expenses for a particular data, or event, can be traced for all said expense categories;
   providing a plurality of operational assistance routines in said main menu;
   providing a name module as one of said operational assistance routines, whereby a range of dates, or events, can be entered for all of said expense modules;
   said operational assistance routines including a modify routine; and further including the step of storing a modify menu including each of said expense categories and providing each of said normal expense categories with modify alpha-numeric identifiers whereby said expense categories are individually available for selective call up and previously made entries can be modified, new entries can be made, and running category totals can be calculated.

2. The method of claim 1 further including a mileage category and wherein said mileage category can be entered by selecting between a mileage entry or an odometer entry.

3. The method of claim 2 wherein said main menu includes a save category whereby all data relating to any selected category can be saved under the name shown for the selected category.

4. The method of claim 3 wherein said main menu includes a print category whereby a print out of all internal data is provided upon selection of the print category.

5. The method of claim 4 wherein said expense modules include the categories of mileage, meals, lodging, telephone, fuel, parking, tolls, miscellaneous, gratuity, transportation, business conference and entertainment.

6. A method of calculating and storing business expenses comprising the steps of:
   storing a main menu of normal expense categores in a data storage unit;
   providing each of said expense categories with an individual alpha-numeric identifier whereby each of said expense categories is available for selective call up,
   providing a tag category in said main menu; whereby all expenses for a particular date, or event, can be traced for all said expense categories;
   providing a plurality of operational assistance routines in said main menu, said operational assistance routines including a modify routine; and further including the step of storing a modify menu including each of said expense categories and providing each of said normal expense categories with modify alpha-numeric identifiers whereby sad expense categories are individually available for selective call up and previously made entries can be modified, new entries can be made, and running category totals can be calculated.

7. The method of claim 6 further including the step of providing a name module as one of said operational assistance routines, whereby a range of dates, or events, can be entered for all of said expense modules, 8. The method of claim 7 further including a mileage category and wherein said mileage category can be entered by selecting between a mileage entry or an odometer entry.

9. A method of calculating and storing business expenses comprising the steps of:
   storing a main menu of normal expense categories as separate modules in a data storage unit whereby additions to and deletions from said main menu are possible;
   providing each of said expense categories with an individual alpha-numeric identifier whereby each of said expense categories is available for selective call up and whereby entires to individual categories can be made without affecting other categories;
   providing a tag category in said main menu; whereby all expenses for a particular date, or event, can be traced for all said expense catgories and whereby entires to individual categories can be made without affecting other categories;
   providing a plurality of operational assistance routines in said main menu, said operational assistance routines incuding a modify routine; and further including the step of storing a modify menu including each of said expense categories and providing each of said normal expense categories with modify alpha-numeric identifiers whereby said expense categories are individually available for selective call up and previously made entires can be modified, new entires can be made, and running category totals can be calculated.

10. The method of claim 9 wherein said mileage category can be entered by selecting between a mileage entry or an odometer entry.

* * * * *